(12) United States Patent
Liebermann

(10) Patent No.: US 6,265,695 B1
(45) Date of Patent: Jul. 24, 2001

(54) FOOD THERMALIZATION DEVICE AND METHOD

(76) Inventor: Benno Liebermann, 2805 Lime Kiln La., Louisville, KY (US) 40222

( * ) Notice: Subject to any disclaimer, the term of this patent is extended or adjusted under 35 U.S.C. 154(b) by 0 days.

(21) Appl. No.: 09/325,132

(22) Filed: Jun. 8, 1999

Related U.S. Application Data

(63) Continuation-in-part of application No. 09/083,777, filed on May 13, 1998, now Pat. No. 5,948,301, which is a continuation-in-part of application No. 08/794,271, filed on Jan. 31, 1997, now abandoned.

(60) Provisional application No. 60/063,430, filed on Oct. 28, 1997.

(51) Int. Cl.[7] .............................. A23L 1/025; A47J 39/02; A47J 36/24
(52) U.S. Cl. ..................... 219/385; 219/214; 219/411; 219/399; 99/339; 99/357
(58) Field of Search .................................. 219/385–387, 219/400, 402, 408, 409, 411, 214, 399; 221/150 A; 222/146.5; 426/237, 243, 302, 466, 523; 99/339, 357

(56) References Cited

U.S. PATENT DOCUMENTS

| | | |
|---|---|---|
| D. 375,680 | 11/1996 | Liebermann . |
| D. 375,681 | 11/1996 | Liebermann . |
| 2,059,133 | 10/1936 | Merritt . |
| 2,179,256 | 11/1939 | Gill . |
| 2,949,524 | 8/1960 | Scarioni . |
| 3,059,087 | 10/1962 | Perlman . |
| 3,095,495 | 6/1963 | Gvozdjak et al. . |
| 3,131,280 | 4/1964 | Brussell . |
| 3,313,917 | 4/1967 | Ditzler et al. . |
| 3,632,968 | 1/1972 | Wilson . |
| 3,674,982 * | 7/1972 | Hoyt et al. .......................... 219/400 |
| 3,697,728 | 10/1972 | Stirzenbecher . |
| 3,908,749 * | 9/1975 | Williams .............................. 219/386 |
| 4,036,401 * | 7/1977 | Nachtigall, Jr. .................. 221/150 A |
| 4,047,476 | 9/1977 | Liebermann . |
| 4,100,397 | 7/1978 | Kunimi . |
| 4,167,983 | 9/1979 | Seider et al. . |
| 4,191,881 * | 3/1980 | Ahlgren et al. ...................... 219/411 |
| 4,210,675 | 7/1980 | Liebermann . |
| 4,224,862 | 9/1980 | Liebermann . |
| 4,238,669 | 12/1980 | Huntley . |
| 4,278,697 | 7/1981 | Liebermann . |
| 4,331,858 | 5/1982 | Wagner . |
| 4,367,243 | 1/1983 | Brummett et al. . |
| 4,374,319 * | 2/1983 | Guibert ................................ 219/400 |
| 4,381,317 * | 4/1983 | Fournier et al. ..................... 426/302 |
| 4,436,356 | 3/1984 | Stelling . |
| 4,580,035 | 4/1986 | Luscher . |
| 4,675,507 | 6/1987 | Akiyoshi et al. . |
| 4,716,819 | 1/1988 | Beltz . |
| 4,731,251 * | 3/1988 | Jovanovic ............................ 426/243 |
| 4,737,373 | 4/1988 | Forney . |

(List continued on next page.)

FOREIGN PATENT DOCUMENTS

| | | |
|---|---|---|
| 86 06 5785 | 6/1986 | (DE) . |
| 066 594A | 7/1981 | (GB) . |
| 8900344 | 9/1990 | (NL) . |

* cited by examiner

Primary Examiner—Joseph Pelham
(74) Attorney, Agent, or Firm—Maurice L. Miller, Jr.

(57) ABSTRACT

A food thermalization device is provided, which permits the food to be thermalized and held for extended periods of time without causing the food to deteriorate. The device includes an electrically-resistance-heated plate, which is controlled to equilibrate at a set temperature in the range of 160° F. to 185° F., with a fluctuation not exceeding plus or minus 5° F. The plate draws much less power than other food cooking devices and occupies much less space for the amount of food it can prepare. A browning oven is also provided for exposing unwrapped food to very high temperature radiation for a short period of time to brown the food.

7 Claims, 22 Drawing Sheets

U.S. PATENT DOCUMENTS

| | | | |
|---|---|---|---|
| 4,842,882 | * 6/1989 | Paulucci | 426/523 |
| 5,021,635 | 6/1991 | Willett . | |
| 5,036,179 | 7/1991 | Westerberg et al. . | |
| 5,177,341 | 1/1993 | Balderson . | |
| 5,243,171 | 9/1993 | Wood et al. . | |
| 5,273,360 | 12/1993 | Wyatt et al. . | |
| 5,296,683 | 3/1994 | Burkett et al. . | |
| 5,345,923 | 9/1994 | Luebke et al. . | |
| 5,378,872 | 1/1995 | Jovanovic . | |
| 5,396,046 | * 3/1995 | Oelfke | 219/386 |
| 5,403,997 | 4/1995 | Wimpee et al. . | |
| 5,404,935 | 4/1995 | Liebermann . | |
| 5,434,390 | 7/1995 | McKee et al. . | |
| 5,454,427 | 10/1995 | Westbrooks et al. . | |
| 5,517,005 | 5/1996 | Westerberg et al. . | |
| 5,535,664 | 7/1996 | Rokowski . | |
| 5,552,172 | 9/1996 | Liebermann . | |
| 5,555,794 | 9/1996 | Templeton et al. . | |
| 5,569,478 | 10/1996 | Liebermann . | |
| 5,570,625 | 11/1996 | Liebermann . | |
| 5,642,658 | 7/1997 | Liebermann . | |
| 5,655,434 | 8/1997 | Liebermann . | |
| 5,665,259 | 9/1997 | Westerberg . | |
| 5,676,870 | * 10/1997 | Wassman et al. | 219/400 |
| 5,701,804 | 12/1997 | Liebermann . | |
| 5,708,255 | 1/1998 | Lamanna et al. . | |
| 5,716,657 | 2/1998 | Liebermann . | |
| 5,726,423 | 3/1998 | Westerberg et al. . | |
| 5,736,713 | 4/1998 | Westerberg . | |
| 5,801,362 | * 9/1998 | Pearlman et al. | 219/400 |
| 5,900,173 | 5/1999 | Robards, Jr. . | |
| 5,986,239 | * 11/1999 | Corrigan, III et al. | 219/385 |

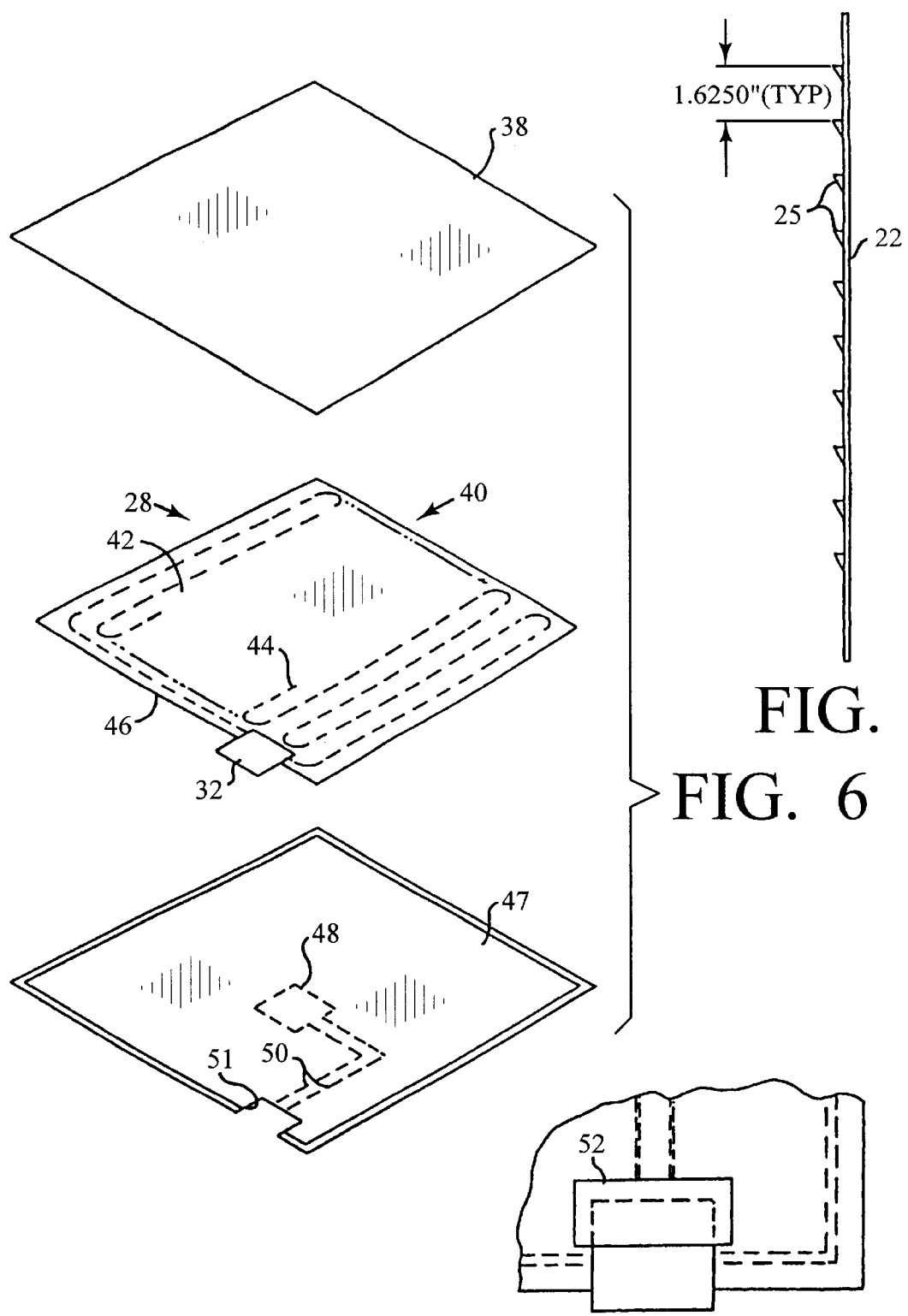

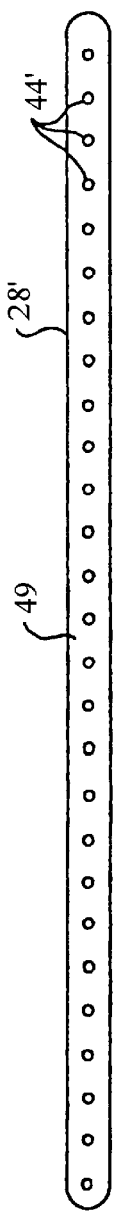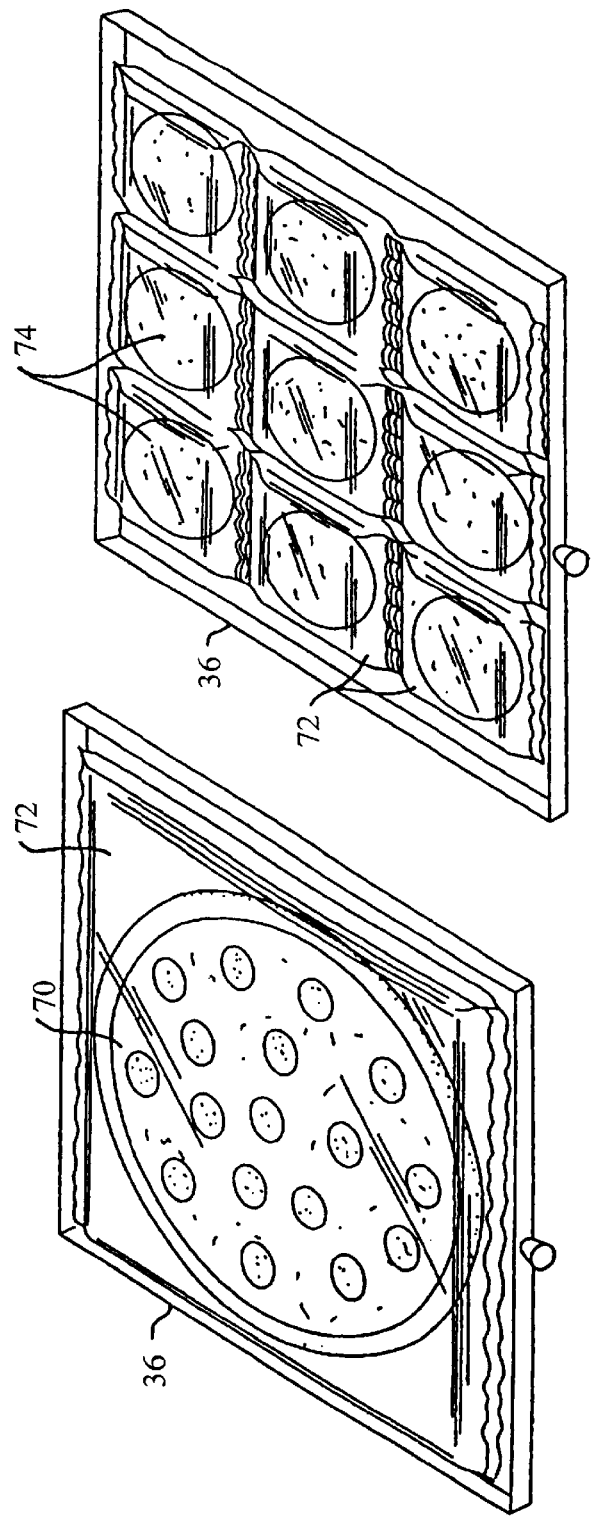

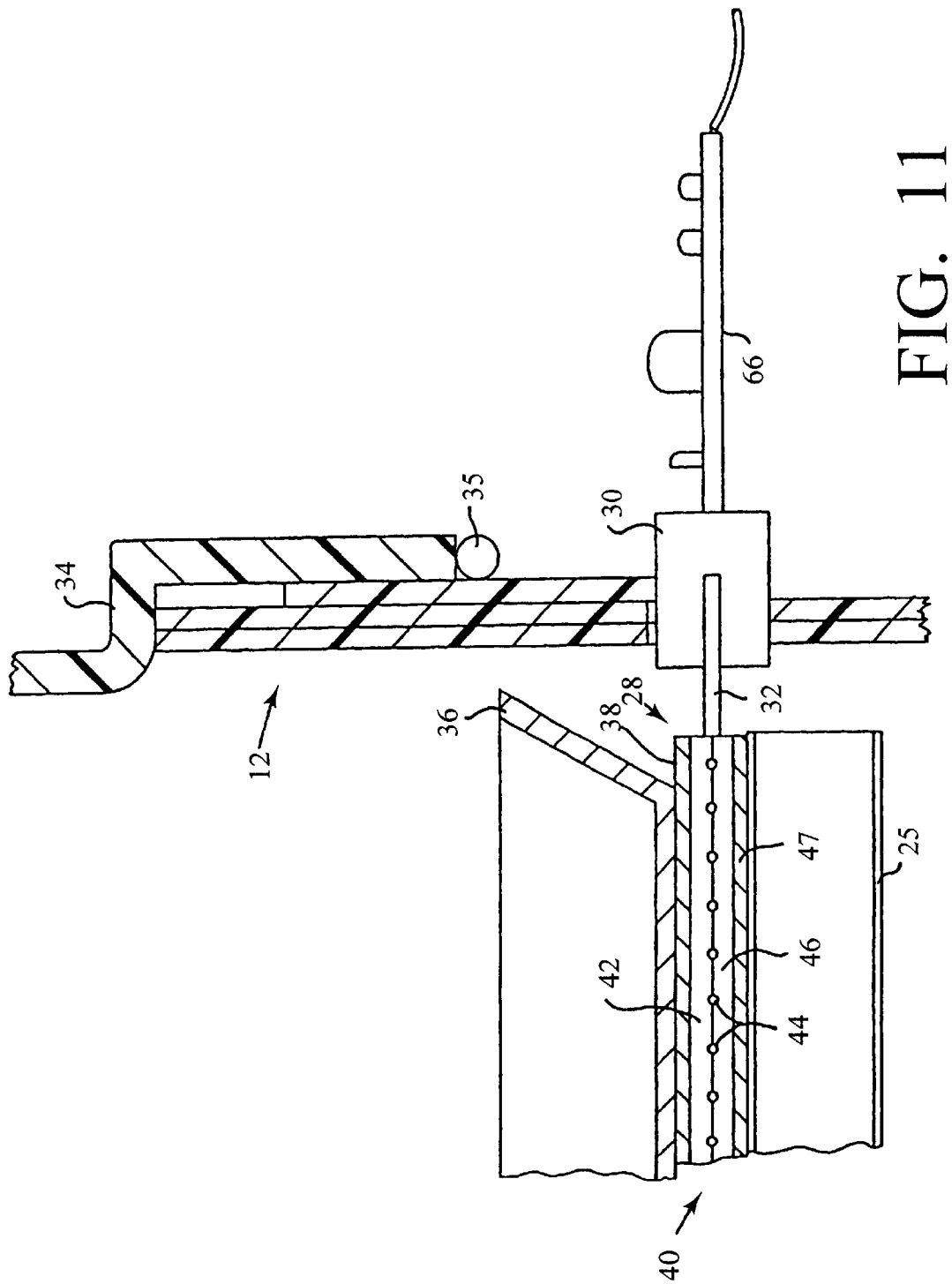

FOOD THERMALIZATION DEVICE AND METHOD

This application is a CIP of U.S. patent application Ser. No. 09/083,777, filed Aug. 13, 1998, now U.S. Pat. No. 5,948,301, which is a CIP of U.S. patent application Ser. No. 08/794,271, filed Jan. 31, 1997, abandoned, which is a continuation of Provision Appl. No. 60/063,430, filed Oct. 28, 1997.

BACKGROUND OF THE INVENTION

The present invention relates to a device and method for heating and staging food, and, in particular, to a device that can pasteurize and hold food at a ready-to-eat, heated temperature for an extended period of time without causing the food to dry out.

People have been heating and cooking food for a long time and, over the centuries, have created a variety of devices for heating food, beginning with an open fire, and moving on to a stove, an oven, a microwave oven, a griddle, a fryer, and so forth. Almost all of the heating devices heat to a high temperature, well above the boiling point of water. These devices can be very useful for cooking the food if the cook is attending closely to be sure the food does not burn or dry out during the cooking process, and if the food is to be eaten promptly after it is cooked. However, these devices are not good for thermalizing and holding frozen foods, raw foods, or pre-cooked foods at a ready state at optimal quality for any extended period of time without causing deterioration of the food. Also, because these devices must be able to heat to a high temperature, they use large amounts of energy, so that, for example, an electric stove must be connected to 220 volt power rather than the usual 110 volt household current.

There are several devices that have been constructed for holding food, but they all involve the use of temperatures at or above the boiling point of water. Food is mostly made up of water, so, at those temperatures, the vapor pressure inside the food increases, driving water out of the food, and thereby causing the food to dry out and deteriorate as it is held.

For example, it is possible to purchase pre-cooked, frozen chicken breasts, but there is currently no good, practical way, with the existing technology, to rethermalize those chicken breasts and hold them at a safe temperature, in which pathogens would be killed, without also drying out the meat. If the chicken breasts are put into an oven, they dry out. If they are put into a microwave, they dry out, and a microwave is not designed to hold food, only to heat it quickly. If they are heated on top of the stove or in an electric griddle or frying pan, again the high temperatures cause them to dry out.

U.S. Pat. No. 5,701,804 "Liebermann", which is hereby incorporated by reference, describes a clamshell grill with upper and lower plates that are heated by a circulating fluid to a set temperature, which is below the boiling point of water but high enough to kill pathogens. This device solves the problem of how to thermalize and hold food without causing the food to deteriorate, but it is a very expensive device to manufacture and maintain, and it occupies a large volume of space for a relatively small food contact surface area. The Liebermann patent teaches that the way to thermalize the food and maintain the food at the desired temperature is to provide a reservoir of fluid at a fixed temperature between 130° F. and 185° F., prepare special upper and lower hinged food contacting plates with a fluid pathway in each plate, press the food between the plates, and continuously pump fixed temperature fluid through the plates to maintain the plates at a fixed temperature.

As one might imagine, this fluid-heated grill is a large, heavy, bulky device. The surface on which the food rests is at counter-top height, and the large, hinged lid opens upwardly. The fluid reservoir, heater, and pump are housed below the surface. There are three cooking surfaces per device, so the device occupies a floor or counter top area approximately equal to one-third of the total cooking surface area and occupies a height of at least three feet, or a volume of at least one cubic foot per square foot of cooking surface area. The special plates with fluid pathways are expensive to manufacture and are heavy. Since the food is pressed between upper and lower plates, only one thickness of food can be heated between the plates at any given time.

Mr. Liebermann selected a heat transfer fluid rather than electrical resistance heating in the design taught in that patent, because he knew there were problems with hot spots in electrical heating devices, and hot spots would not be acceptable in a design that required a fixed temperature to prevent the deterioration or drying out of the food.

In a typical electric griddle or frying pan, a metal plate is heated by electrical resistance heating. There is a control that allows the cook to set a temperature from a relatively low warm or simmer temperature to a high temperature on the order of 400° F. In order to achieve the high temperature, the griddle or frying pan must be designed to draw a large amount of power when it is on. That means that, when it is set at a low temperature, it is actually cycling on and off, making large temperature swings on the order of ±20° F. Also, because of the high power draw of the resistance heater, the heater becomes hot very quickly, creating hot spots on the griddle or frying pan. Thus, the typical electric griddle or frying pan would not be suitable for heating and holding food in a narrow temperature range below the boiling point.

U.S. Pat. No. 5,403,997 "Wimpee" recognizes the problem of hot spots with electrical heating systems and suggests the use of two different sets of resistance heaters at different power levels, so that the control system would cycle between the two sets of resistance heaters rather than cycling on and off. However, even if the Wimpee system eliminates the problem of hot spots, it still teaches that a food warmer should operate above the boiling point, in the range of 215° F.–240° F., which causes deterioration of the food, and its proposed system for eliminating hot spots would be complicated and expensive.

SUMMARY OF THE INVENTION

The present invention takes advantage of the teachings of the cited Liebermann reference but goes much further, to provide a practical device which is much less complicated, less expensive to manufacture and maintain, and occupies far less volume per square foot of food contact surface area than that design. Also, the device of the present invention does not require the food to be pressed between two plates but heats the food on a single plate, which means that food of different thicknesses can be heated on the same plate at the same time and that the space and expense of a second plate are eliminated.

The present invention provides a simple, electric resistance heating system which maintains the food-contacting plate at a fixed temperature below the boiling point, so that there is minimal fluctuation of temperature. The temperature preferably equilibrates to a fixed point between 160° F. and 185° F., with a fluctuation of plus or minus 5° F. or less (in a preferred embodiment the fluctuation is ±2° F.). This temperature is high enough to ensure the safety of the food (killing any pathogens) and is low enough to prevent the food from drying out.

By limiting the temperature to a preset temperature below the boiling point, the present invention reduces the power requirements from prior art systems, requiring less than 200 watts per square foot of food contact surface area, as compared with greater than 300 watts per square foot of food contact surface area in prior art electric resistance heated plates. This means that the present invention can heat at least seven to ten square feet of food using normal household wiring, not exceeding 1.5 KW, and, in a preferred embodiment, in which each square foot of food contact surface area draws approximately 150 watts, the device can heat ten square feet of food contact surface area with normal 110 volt service, not exceeding 1.5 KW. Also, by designing the plate to operate only at low temperatures and by keeping the area of each plate relatively small, there are no problems with hot spots on the plate; the entire plate remains at one temperature. When cold food is placed on the plate, the temperature of the plate will drop temporarily, but then the plate and the food on the plate gradually rise in temperature, with the plate and the food equilibrating at the set temperature.

In a preferred embodiment, a controller is used to cycle the power on and off as needed to maintain the desired temperature below 212° F. and preferably at a set temperature in the range of 160° F. to 185° F., ±5° F. With this arrangement, food can be thermalized to a set temperature, such as 175° F., ±5° F., and can be held at that set temperature for extended time periods, on the order of eight hours, while maintaining the quality of the food.

In a preferred embodiment of the invention, several electrical-resistance-heated food contact plates are spaced vertically, each plate maintained at a fixed temperature in the preferred range, with little temperature variation. The space above each plate is small enough to prevent excessively large food products from being inserted into the device, which ensures that the food that is put into the device is properly thermalized. This device is not intended to be used to prepare the family's Christmas turkey but rather to thermalize and hold relatively thin foods such as hamburgers, hot dogs, chicken breasts, pizzas, burritos, calzones, rice dishes, and so forth.

By maintaining a relatively small spacing between plates, one can easily obtain ten square feet of food contact surface with a footprint of only one square foot, and the device can sit on the counter top, so it does not occupy the height of other devices but rather only about two cubic feet for ten one-foot square plates spaced above one another, or a volume of about 0.2 cubic feet per square foot of food contact surface area. This compares favorably with the earlier Liebermann design, which used fluid heat transfer plates and occupied approximately one cubic foot per square foot of food contact surface area, or approximately five times the volume of the present invention. In other words, the present invention requires approximately ⅕th the amount of space to prepare the same amount of food as the earlier Liebermann design.

With this preferred embodiment, a family could put its dinner choices into the home appliance version of the device in the morning and have dinner waiting in good condition in the evening, or the family could put frozen dinner choices into the device when returning home and have dinner ready in approximately half an hour to one hour. It is expected that a device for home use might have 4–6 one-square-foot plates, while a commercial unit might have ten one-square-foot plates. A small, one-square-foot counter top device with ten plates could prepare and hold 90 hamburgers or ten pizzas, making it ideal for catering parties, for fast food restaurants, and so forth, using only normal 110 volt service and without the need for special hoods or vents. A household device could be an even smaller unit, comparable in size to a toaster oven but with far greater capacity.

Since the plates are always at a low temperature, which one can bump into without getting burned, no fumes are driven off that would require hoods and vents, and the device could be used anywhere—in the home, store front, kiosk, and so forth.

The preferred embodiments of the present invention include electronic controls that make the device very easy to use and require no special training and little attention, while still ensuring that the food is heated to a pathogen-free and aesthetically pleasing temperature. It is not necessary to remove the product promptly—just leave it in the device for hours without harming the food.

One preferred embodiment includes an additional browning oven which exposes the food to very high temperatures in the range of 1500° F. to 1600° F. for approximately 45–60 seconds after thermalizing the food and before serving the food. This is especially desirable for a food product such as pizza. Using this device, several pizzas could be rethermalized and held, and then each pizza could be finished in the browning oven as needed. Even with the high temperature browning oven, it is not necessary to remove the food at exactly the time it is finished, because the browning oven automatically turns off at the end of a fixed time, and, as soon as it is turned off, the food is no longer exposed to the high temperatures, due to the cooling fan.

Another preferred embodiment includes a bun and pastry warmer compartment on the top of the device.

Another preferred embodiment includes a spring-biased electrically-heated plate, which can be used instead of Sterno to heat a chafing dish, eliminating the fire hazard and fumes of Sterno, while protecting the food against burning and drying out. Also, the electrically-heated plate may be curved to serve as the support for a chafing dish as well as the heat source for the chafing dish.

Another preferred embodiment adds a heat-conducting insert on top of the food.

Another preferred embodiment adds heat-conducting fins on the food-supporting tray.

Because the power draw of each plate is low, less than 200 watts per square foot of food contact surface area, it is possible to power at least seven square feet of food contact surface area with normal household 110-volt service, making the device useful anywhere—both for home and commercial use.

Thus, the present invention provides a simple, economical system for thermalizing food and for maintaining the food at a pathogen-free, ready-to-eat temperature without causing deterioration of the food. The plates of the present invention may be stacked to form a rack; they may be placed side-by-side; they may be made larger or smaller; and they may be used in commercial establishments or in the home.

BRIEF DESCRIPTION OF THE DRAWINGS

FIG. 6 is an exploded rear perspective view of one of the plates of the rack of FIG. 1;

FIG. 6A is a sectional view of an alternative plate;

FIG. 7 is a broken-away bottom view of the plate of FIG. 6;

FIG. 8 is a rear view of one of the plate supports in the rack of FIG. 1;

FIG. 9 is a perspective view of a pizza on one of the food trays of the rack of FIG. 1;

FIG. 10 is a perspective view of several hamburgers on one of the food trays of the rack of FIG. 1;

FIG. 11 is a broken-away side sectional view of the top portion of the food thermalization rack of FIG. 1;

DESCRIPTION OF THE PREFERRED EMBODIMENTS

Figure 1:
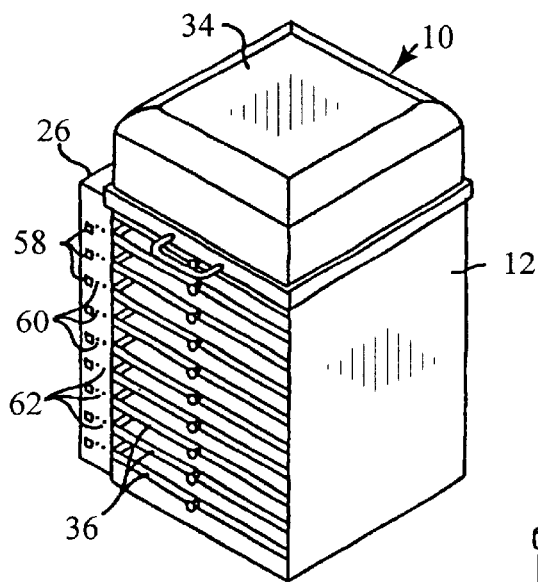
FIG. 1 is a front perspective view of a food thermalization rack made in accordance with the present invention.
Figure 2:
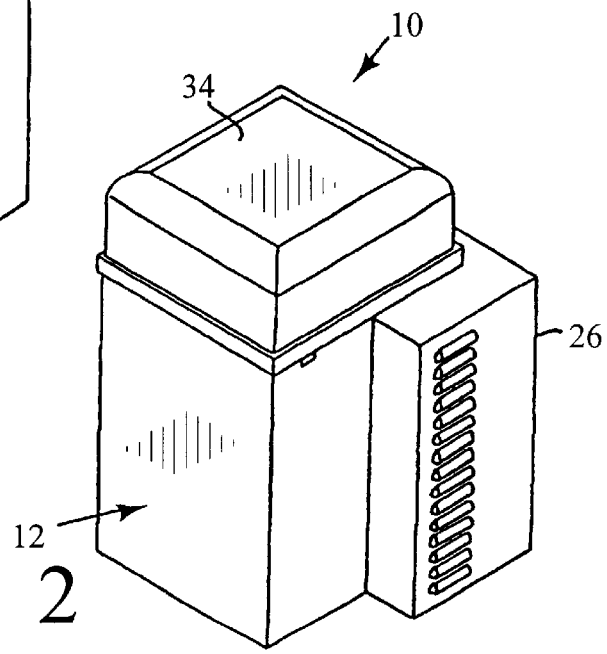
FIG. 2 is a rear perspective view of the food thermalization rack of FIG. 1.
Figure 3:
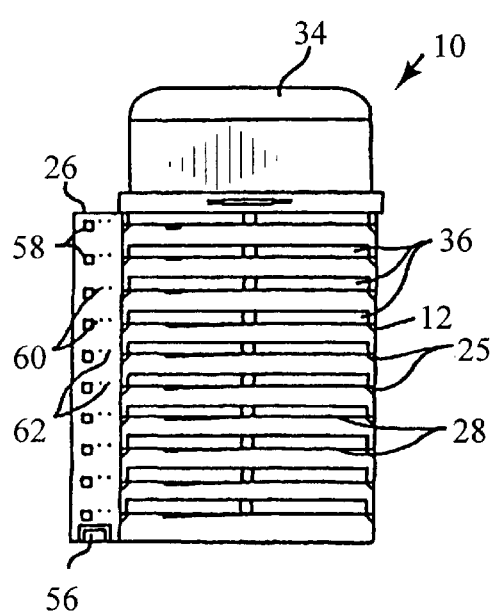
FIG. 3 is a front view of the food thermalization rack of FIG. 1.
Figure 4:
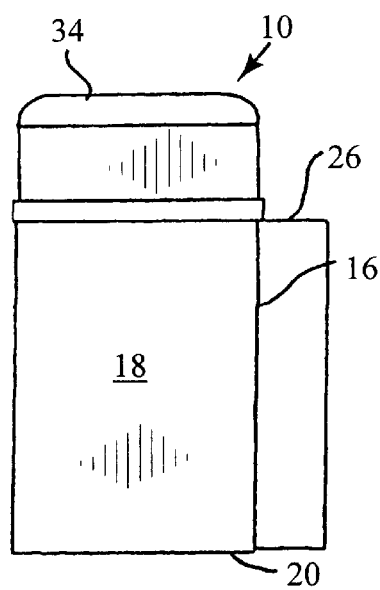
FIG. 4 is a right side view of the food thermalization rack of FIG. 1.

FIGS. 1–11 show an example of a food thermalization rack 10 made in accordance with the present invention. The rack 10 includes an outer shell 12, which is preferably made of sheet metal but may also be made of plastic or other suitable materials. The shell 12 includes a left side 14, a rear 16, a right side 18, and a bottom 20. Left and right rack support sheets 22, 24 are mounted to the inside of the left and right shell portions 14, 18, respectively. A rear view of the left rack support sheet 22 is shown in FIG. 8, where it is clear that each rack support sheet 22, 24 includes a plurality of elongated rack support projections 25. The rack support sheets 22, 24 are preferably made of molded plastic, although other materials could be used. A control block 26 is mounted on the left side of the shell 12 by means of a hinge 37 and includes buttons and indicator lights, which will be described later. A plurality of resistance-heated plates 28 is inserted into the rack 10, with each plate 28 resting on aligned left and right rack support projections 25. In the preferred embodiment, the vertical spacing between rack support projections 25 is less than two-and-one-half inches and preferably less than 1-3/4 inches. This ensures that the food placed in the rack 10 is thin enough to be properly thermalized by the plates 28 and permits a large quantity of food to be heated in a small volume. Food-receiving trays 36, sized to fill the plates 28, are slid onto each plate from the open front of the rack 10, with the trays 36 resting directly on the respective plates 28. The trays 36 are preferably made of metal or other rigid, heat-conducting material. As is described below, the plates may also be made of a variety of materials.

Figure 14:
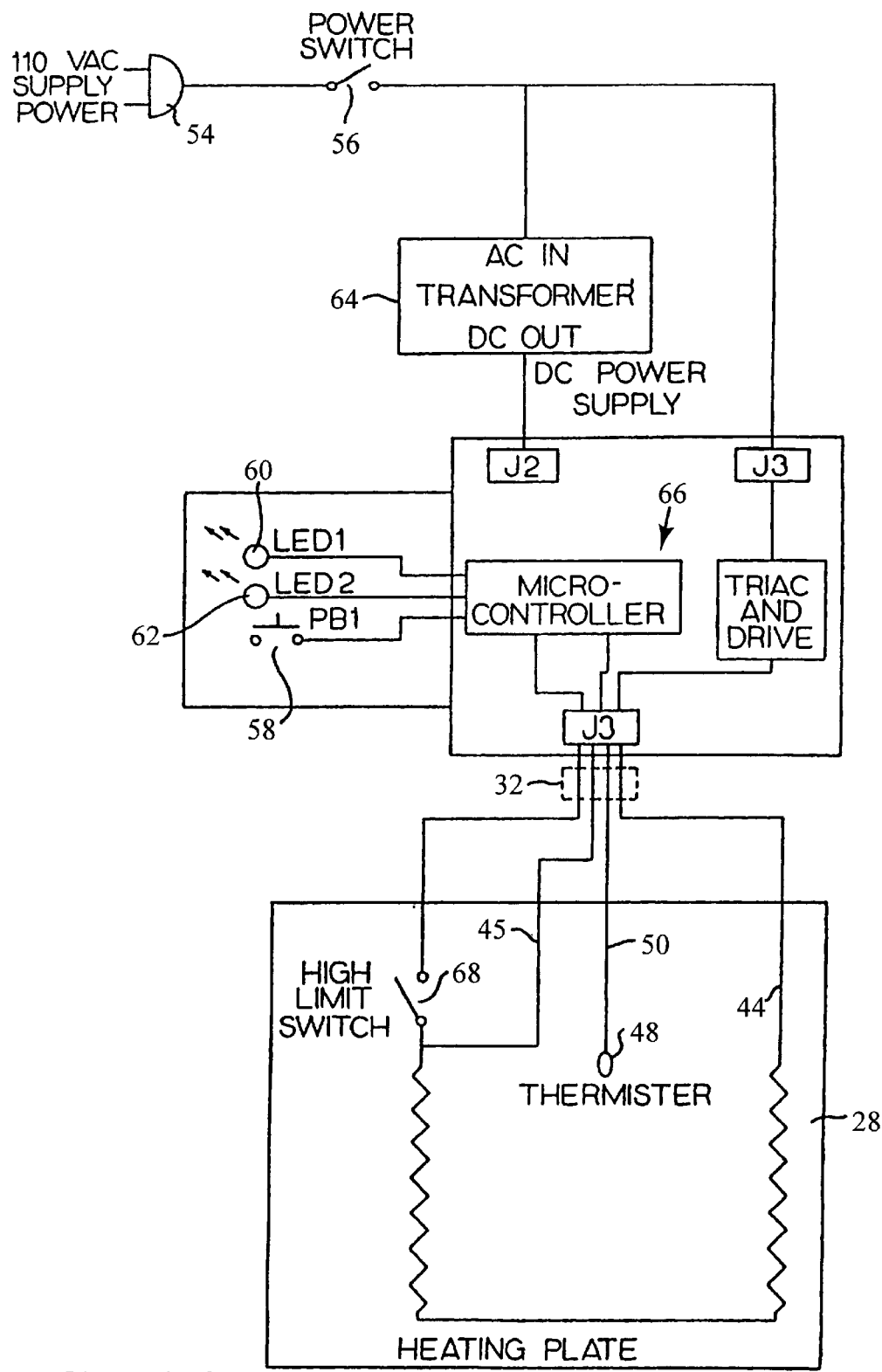
FIG. 14 is a block diagram showing the control system for one plate of the food thermalization rack of FIG. 1 and for the single-plate arrangements of FIGS. 22, 22A, 23, and 24.

On the back portion of the rack 10 are electrical edge connector receptacles 30, which receive respective edge connectors 32 on the plates 28 (shown in FIGS. 6, 7, and 11). The receptacles 30 are electrically connected to control boards 66, as shown in FIGS. 11 and 14, and the control boards 66 are in the control block 26. For now, at the prototype stage, there is a separate control board 66 for each plate 28, but, in later stages of development, it is thought that it may be more desirable to put all the controls on a single, multi-channel board.

On the top of the rack 10 is a bread and pastry warmer cover 34, which is hinged to the back 16 of the shell 12 by hinges 35. The bread and pastry warmer cover 34 is preferably made of a clear plastic. If the bread and pastry warmer is not desired, the top of the shell 12 may be closed off by a flat top (not shown), which would be identical to the bottom 20. The food to be thermalized is placed on the conductive trays 36, which simply rest on the plates 28 and can be slid in and out to put food into and out of the rack 10.

FIGS. 6 and 7 show a preferred embodiment of a plate 28. The plate 28 is made of three main pieces. First is a top plate portion 38, which, in this preferred embodiment, is made of 0.093-inch-thick aluminum plate. The top plate portion 38 could alternatively be made of other metals or other conductive materials. Next is a silicone glass portion 40, which includes a top sheet 42 of 0.025-inch-thick silicone glass, a resistance wire element 44 under the top sheet 42, and a similarly-configured bottom sheet 46 of silicone glass. The resistance wire element 44 follows an undulating path, covering the entire area of the plate 28, with the spacing between adjacent portions of the wire element 44 being approximately 0.25-inches, which helps ensure a uniform temperature in the plate 28. Finally, there is a bottom sheet 47, preferably made of 0.020-inch-thick aluminum.

In addition to these main elements, there is a sensor 48, which preferably is a thermocouple or thermister, which indicates to the controller 66 the temperature of the plate 28. As shown in FIG. 6, the sensor 48 is located at the center top surface of the bottom plate 47 and includes leads 50 which are soldered to the edge connector 32. The bottom plate 47 defines a notch 51 in the area of the edge connector 32. A silicone patch 52 encloses the connection between the edge connector 32 and the leads 50. The edge connector 32 is also soldered to the two ends of the resistance heater wire 44 and to feedback lead 45 (shown in the schematic in FIG. 14).

The top and bottom metal sheets 38, 47 and the silicone glass portion 40, with the wire 44 and edge connector 32, are vulcanized together to form a single plate 28. An unvulcanized rubber coating is applied to the silicone 42, 46, and, when vulcanized under pressure, it holds the entire metal-silicone-wire sandwich plate 28 together. The plate 28 is then sealed around its perimeter with silicone to prevent anything from entering between the plates and to provide an aesthetically pleasing plate.

The plate 28 described above is one preferred embodiment. However, other materials and other assembly methods could be used to achieve plates that would function in the same way. For example, as shown in FIG. 6A, the plate 28' could be made of the same serpentine resistance wire 44', with its wire 44' and its sensor 48' embedded in a cast conductive ceramic material 49, rather than sandwiched between silicone and metal sheets.

Figure 27:
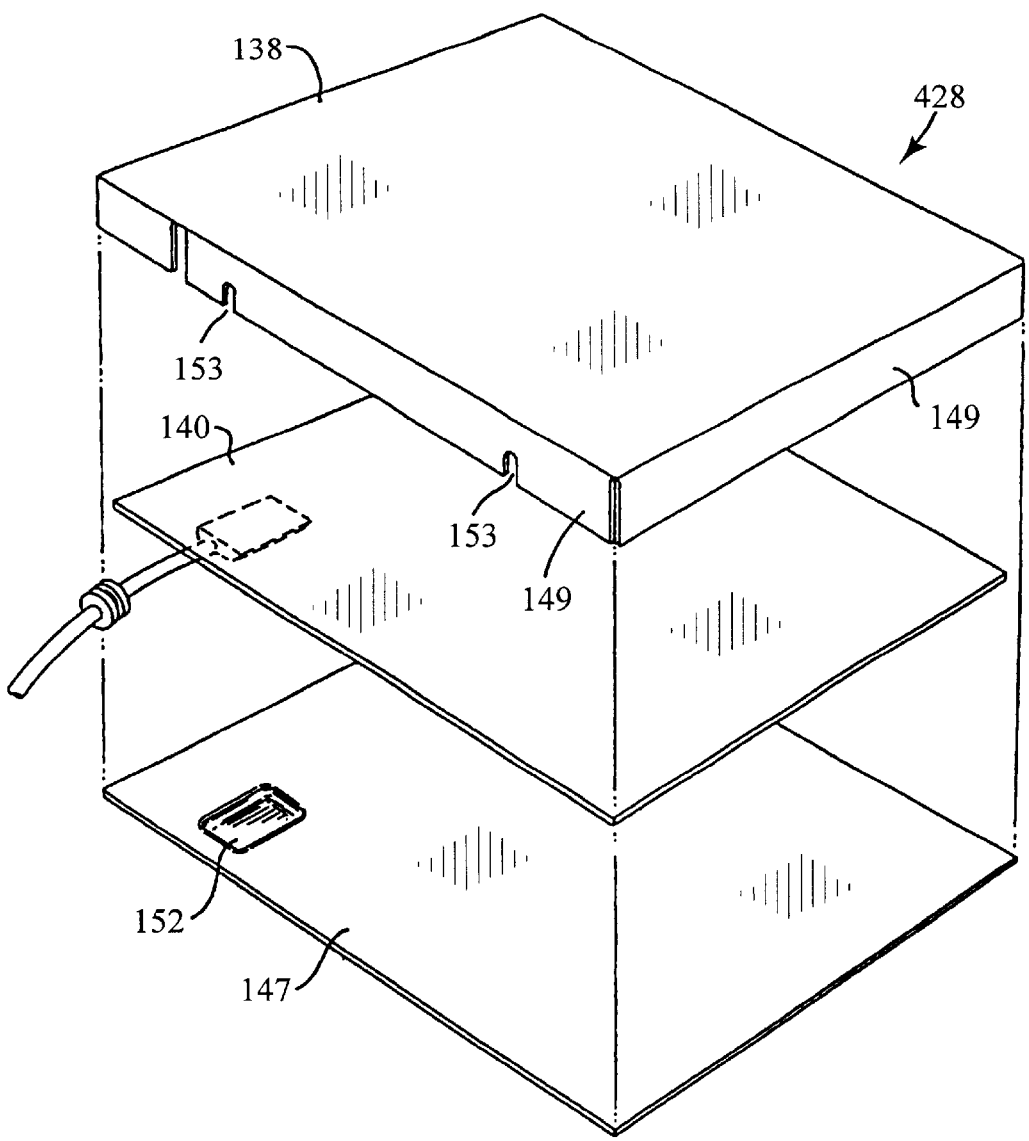
FIG. 27 is an exploded perspective view of one of the plates of the racks of FIGS. 25 and 26.
Figure 28:
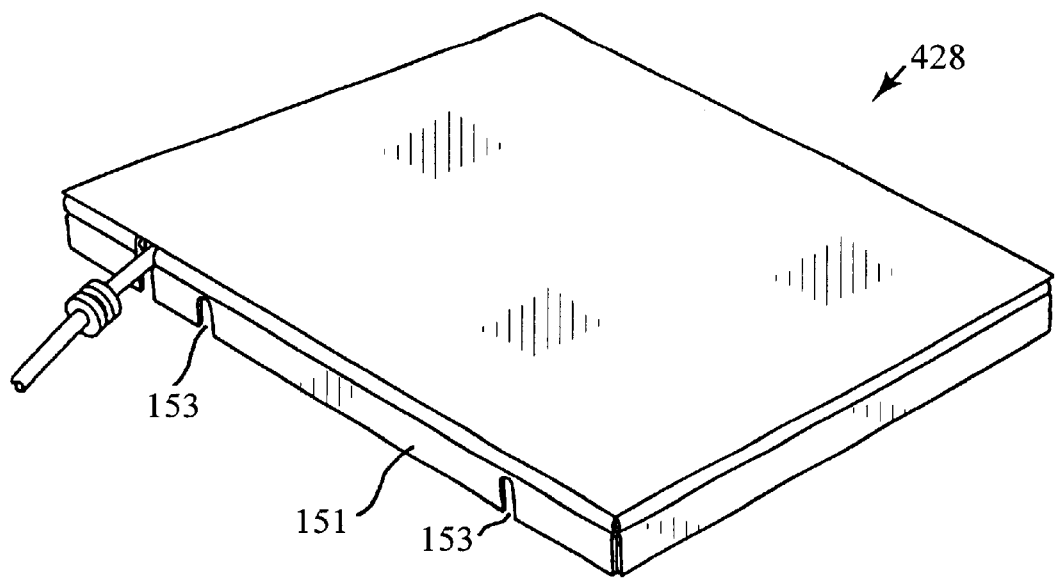
FIG. 28 is a perspective view of the plate of FIG. 27 after it has been assembled.
Figure 29:
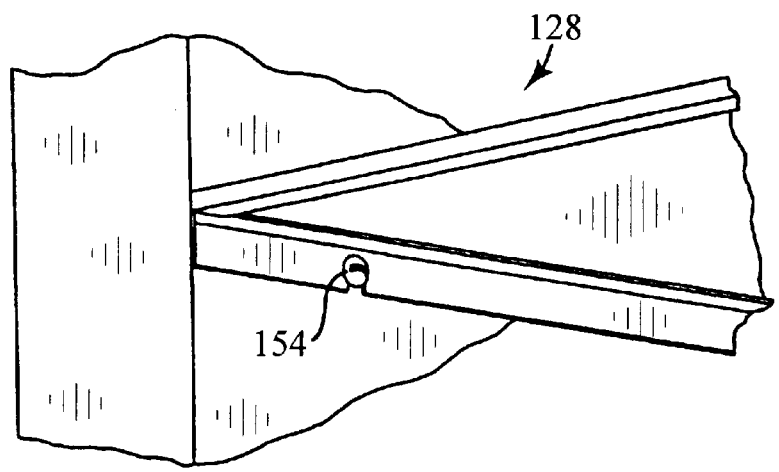
FIG. 29 is a broken-away perspective view showing how the plate of FIG. 28 is mounted in the racks of FIGS. 25 and 26.

Also, instead of using resistance wire 44, the electrical resistance could be provided by a thick film electrically resistive track, as taught in U.S. Pat. No. 5,177,341, which is hereby incorporated by reference. FIGS. 27–29 show another alternative embodiment of a plate 428, which includes a top plate 138, a silicone glass portion 140, and a bottom plate 147 as in the plate 28. However, instead of using a patch as in the earlier embodiment, this embodiment forms an indentation 152 in the bottom plate 147 to receive the bulging connector portion of the silicone glass layer. Instead of an edge connector, this plate 428 has a cord with a grommet that extends through an opening in the left side of the device. Also, instead of sealing around the edge of the plate with a sealant as in the previous embodiment, this embodiment includes edge flaps 149 on the upper plate 138, which fold over the bottom plate 147 to close off the edge of the plate 428. Also, on the sides are extensions 151, which define U-shaped indentations 153, that are used to mount the plate 428 into the shell of the device. As shown in FIG. 29, screws 154 are inserted through the U-shaped indentations 153 to fasten each plate 428 to the inside of the shell of the device.

To control the temperature of the plates 28 on the rack 10, the control arrangement shown in the schematic diagram of FIG. 14 is used. There is a source of electrical power 54, such as regular household, 110-volt, alternating current service. There is an on-off switch 56 on the rack 10, which is used to turn the rack on and off. For each plate 28, a button 58, a red light 60, and a green light 62 are mounted on the control block 26 at the front of the rack 10. There is a transformer 64, which supplies 5 v D.C. to each control board 66, and there is a control board 66 connected to each receptacle 30.

Each edge connector 32 connects to two leads for the resistance wire 44, two leads to the sensor 48, and a feedback lead, which indicates whether the high temperature switch 68 has opened the heater wire circuit due to overheating. There may also be an additional sensor (not shown), which would indicate whether or not a tray is present on a plate 28, and this would also communicate with the control board 66 to cause an alarm signal if the tray is removed before the food on the tray is ready.

The operation of the preferred thermalization rack control system is as follows:

When the on-off switch 56 is turned on, power flows from the power supply 54, through the transformer 64 to the controller 66, and through the triac and drive to the plate 28. So, whenever the rack is turned on, all the plates 28 are being heated. When a person slides out a tray 36, puts food on the tray 36, and slides the tray back in, the person also pushes the button 58 for the plate 28 on which the tray 36 rests. This tells the controller 66 that a cook cycle should begin, and the controller 66 turns on the red light 60, indicating that the food is not yet ready to eat. The controller 66 monitors the temperature of the plate 28, and, when the plate 28 reaches a set temperature, the controller 66 begins a timer. When a preset time is reached, the controller 66 turns off the red light 60 and turns on the green light 62, indicating that the food is ready. The preset time is approximately thirty minutes, or whatever time test results show is sufficient to ensure that the food has reached the desired end temperature, which is the temperature of the plate.

The controller 66 turns the triac and drive on and off, turning the power to the resistance heater wire 44 on and off, as necessary, to maintain the preset temperature, whenever the main switch 56 is turned on. If the controller 66 senses that the temperature of the plate 28 has dropped more than a certain amount, such as 5° F. below the preset temperature, the controller 66 will restart the timer. An alarm (not shown) may be provided to sound if a tray is removed after the button for that tray has been pushed and before the green light 62 comes on. A digital indicator (not shown) may be used instead of the green light.

FIGS. 9 and 10 show examples of the types of foods that may be thermalized on the plates 28. FIG. 9 shows a pizza 70 encased in a sealed, clear plastic wrapper 72, resting on a tray 36. FIG. 10 shows nine hamburger patties 74, individually wrapped in sealed, clear plastic wrappers 72, resting on a tray 36. Each tray 36 may be similarly filled with wrapped or unwrapped food. When the respective trays 36 are slid into the rack 10 onto their respective plates 28, the warm plates 28 begin conducting heat through the trays 36 into the food 70, 74. The temperatures of the plates 28 will drop below the set temperature when cold food is initially inserted, and, as heat is conducted into the food, the plates 28 will come back up to their set temperatures. Once a plate 28 returns to its set temperature, the timer begins, and, once the plate has been at its set temperature for a set time, the green light will come on, indicating that the food is ready. The food may remain at that ready state for several hours, without deterioration of the food. Then, when it is desired to serve some of the food, the tray 36 is slid out, and the food is removed from the tray and served.

Figure 12:
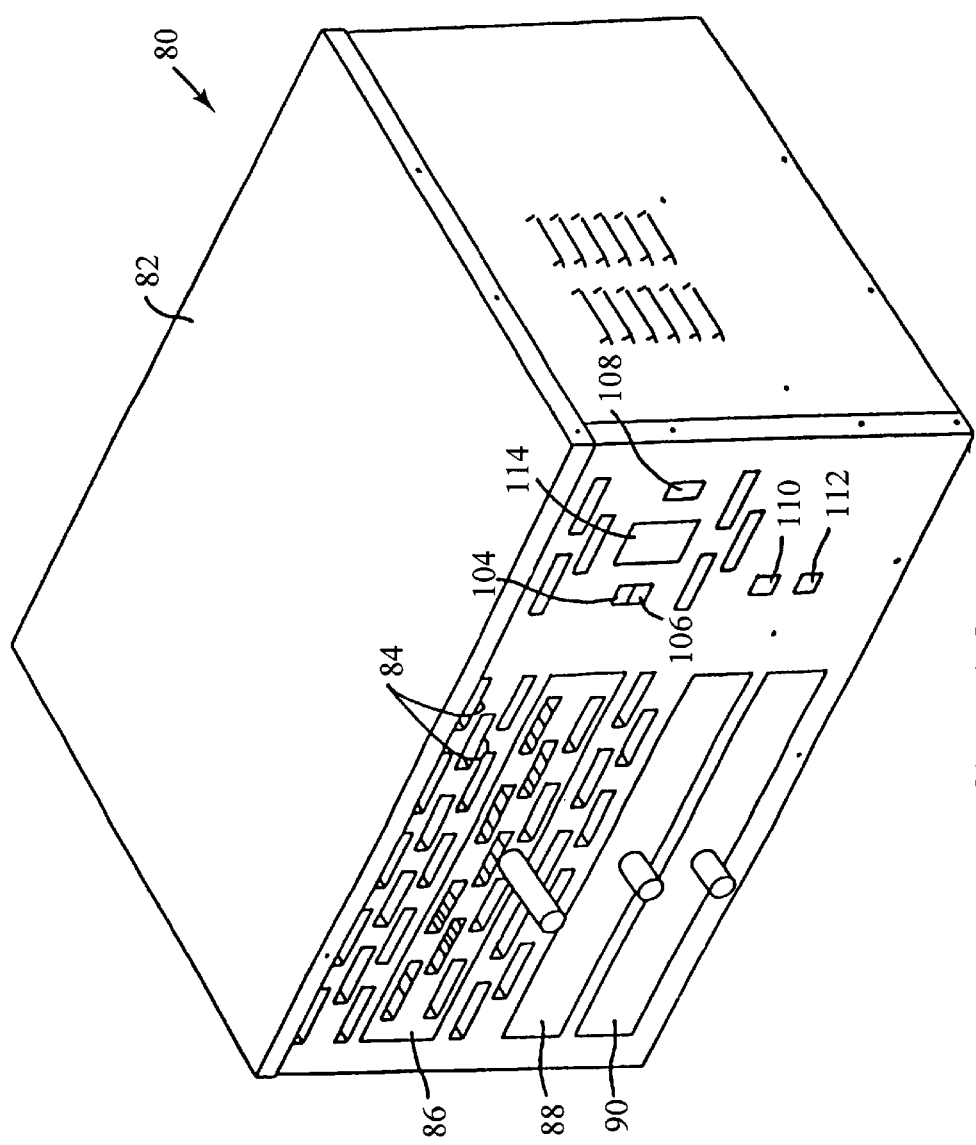
FIG. 12 is a front perspective view of a browning oven made in accordance with the present invention.
Figure 13:
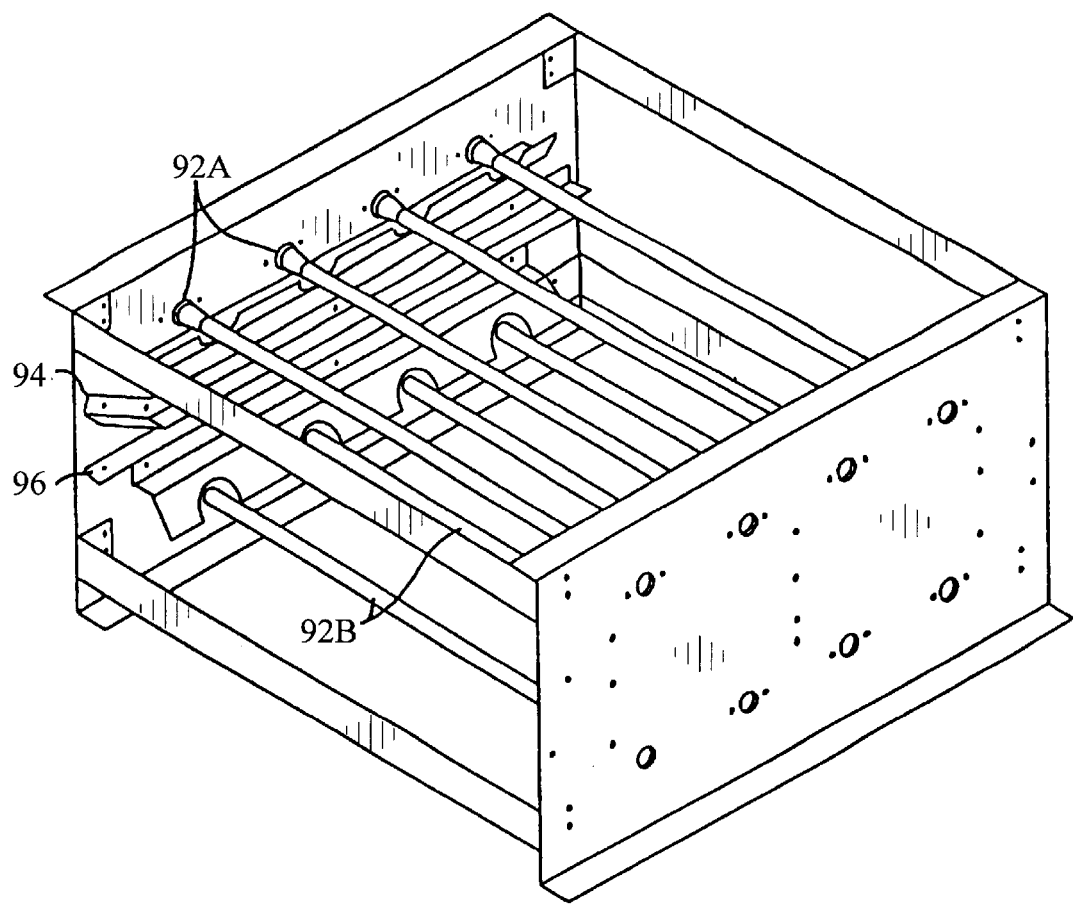
FIG. 13 is a front perspective view of the browning oven of FIG. 12 with the shell, controls, rack, crumb catching tray, and cutting board removed.
Figure 17:
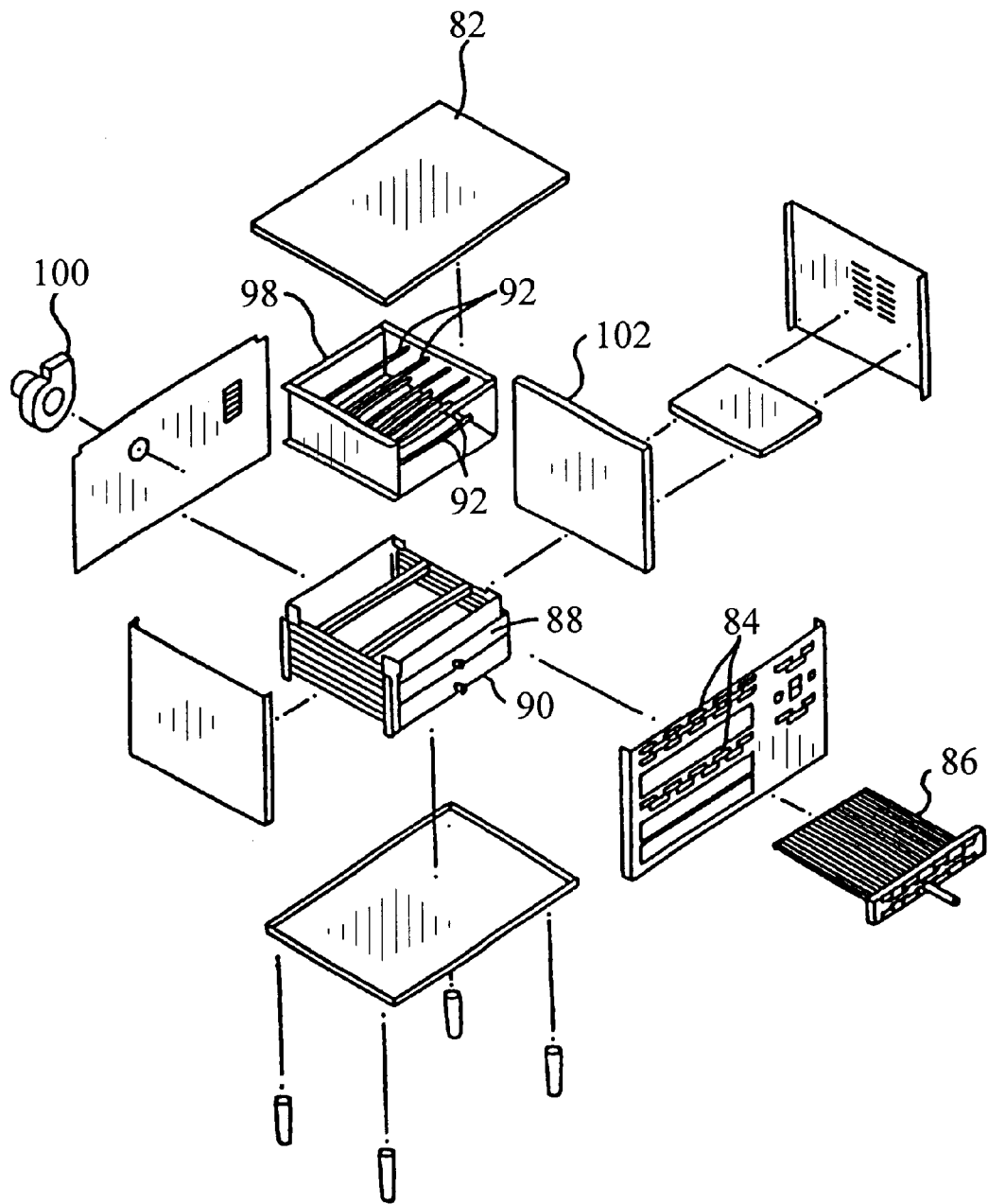
FIG. 17 is an exploded perspective view of the browning oven of FIG. 12.

For foods such as pizza, which are tastier and more appealing to the eye after browning, a browning oven 80, made in accordance with the present invention, may be used. FIGS. 12, 13, and 17 show a preferred embodiment of the browning oven 80. The browning oven 80 includes a shell 82, defining a plurality of openings 84 in its front face, through which air can pass. At the front of the browning oven 80 are three handles for sliding drawer-like elements into and out of the browning oven 80. The uppermost handle is attached to a food support grate 86. The second handle connects to a drawer 88 to catch crumbs. The lowest handle connects to a slide-out cutting to board 90.

FIGS. 13 and 17 show the eight radiant heating elements 92 (four upper elements 92A and four lower elements 92B), which, in the preferred embodiment, are sixteen-inch long, 1100-watt short wave infrared quartz tubes, gold-plated on the upper half of their circumference for high heat transfer efficiency, which achieve a radiation temperature of 1500–1600° F. in four seconds upon activation. The four upper heating elements 92A lie above the food grate 86, and the four lower heating elements 92B lie below the food support grate 86. Upper and lower guides 94, 96, on both sides of the frame 98 guide the food support grate 86 as it is slid into and out of the oven 80. A blower 100 is mounted on the back of the oven 80 and continuously pulls air into the openings 84 in the front of the oven 80, through the oven 80, and out the back of the oven 80 whenever the oven 80 is turned on. This keeps the exterior skin of the oven at a temperature that can safely be touched (ranging from 130° F. to 200° F.), even when the radiant heating elements 92 are turned on.

Figure 18:
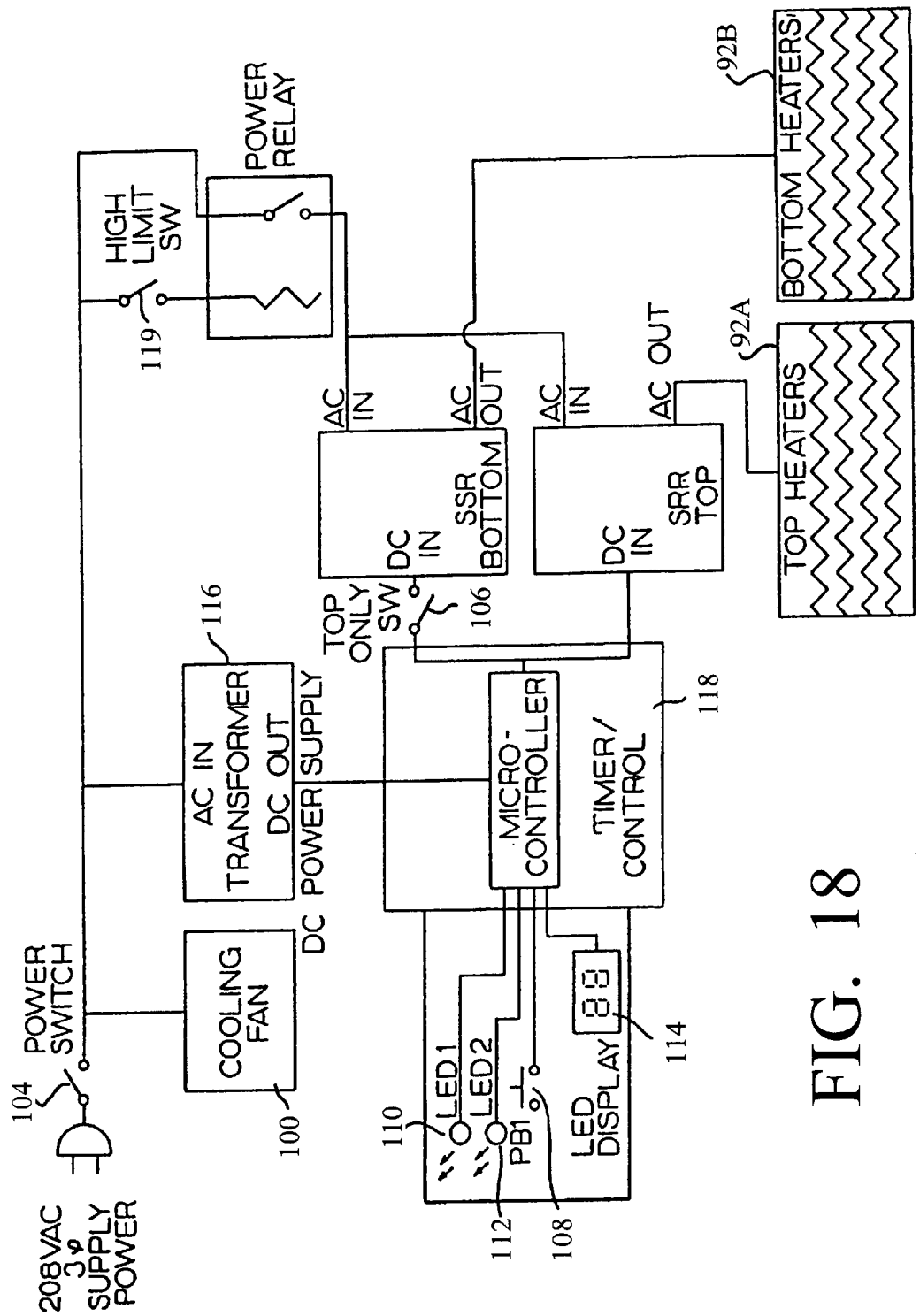
FIG. 18 is a block diagram of the control system for the browning oven of FIG. 12.

The electrical controls for the oven 80 are isolated in a compartment on the right side of the oven 80 by a vertical plate 102 and are shown in the block diagram of FIG. 18. On the front face of the oven 80 are buttons for controlling the oven 80. An on-off button 104 is used to turn the oven power on and off, and another button 106 turns the lower tubes off. There is also another button 108, which is used to set the time (from zero to 99 seconds). There are three displays on the front of the oven 80. There are two lights 110, 112, which indicate when the upper and lower banks of heating elements, respectively, are on. There is also an LED display 114, which indicates the amount of time the oven will be on.

Looking now at FIG. 18, it can be seen that the electrical system also includes a transformer 116, which provides DC power to the controller. There is a micro-controller 118. There is a high limit switch 119, which will turn off the heating elements 92 if the temperature at the switch exceeds a certain set value.

To operate the browning oven 80, first the power switch 104 is turned on. Then, the button 108 is used to set the time, and then the button 108 is hit again to turn on the heating elements 92A, 92B. If the switch 106 is opened, only the top bank of heating elements 92A will turn on; if the switch 106 is closed, both the top and bottom banks 92A, 92B will turn on. The micro-controller 118 measures the time until the time set by the user is over, and then it turns off the heating elements 92. Since this unit requires large amounts of energy, it does not operate on typical household electrical service. Instead, it is expected to use 220 volt service. The heating elements come up to temperature within four seconds, and, once the elements are turned off, the temperature drops quickly. Although this browning oven draws large amounts of energy when it is on, it is only on for short periods of time, thereby using far less energy overall than would be used by a conventional oven.

Figure 15:
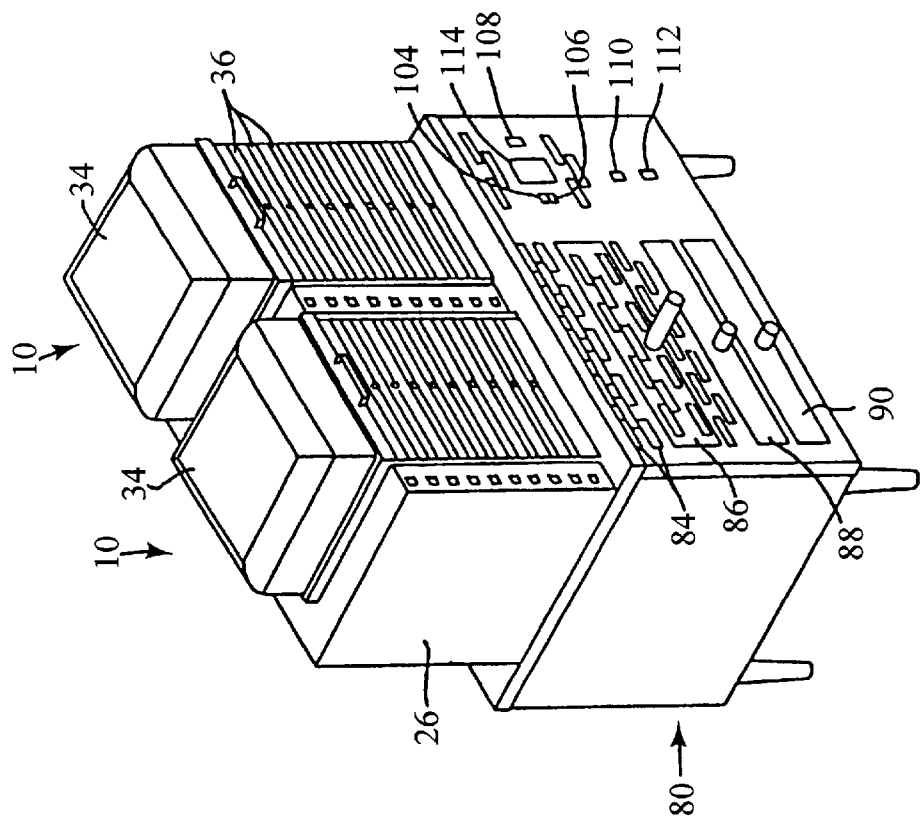
FIG. 15 is a perspective view of a combination of two of the food thermalization racks of FIG. 1 and one of the browning ovens of FIG. 12.
Figure 16:
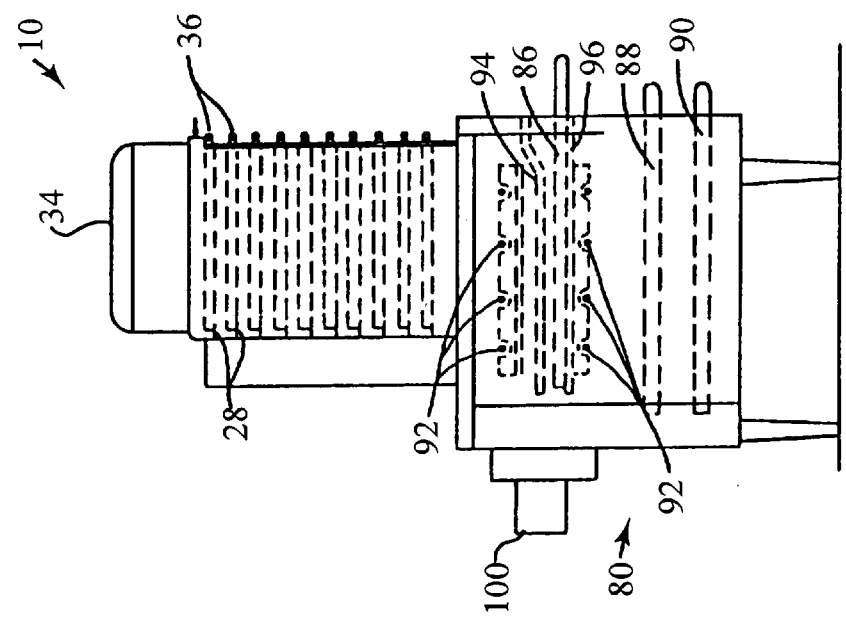
FIG. 16 is a left side sectional view of the combination device of FIG. 15.

FIGS. 15 and 16 show a combined unit, with two of the food thermalization racks 10 of FIG. 1 mounted on top of a browning oven 80 of FIG. 12. This combination is intended for commercial use. For example, it would allow twenty pizzas to be thermalized and held in the racks 10, and, when someone wanted to eat a pizza, a pizza would be removed from its tray, unwrapped, and placed in the browning oven 80 for approximately thirty to ninety seconds to brown the pizza. This arrangement would permit the continuous dispensing of pizzas at a rate of approximately one per minute.

The combination device of FIGS. 15 and 16 is particularly well-suited to the preparation of pizzas, because the thermalization rack 10 provides ideal conditions for the air pockets in the pizza dough to enlarge as the dough is warmed and the air inside the pockets expands.

In the case of pizza, the pizza that is put on the thermalization rack 10 may have a precooked crust, a par-baked crust, or may be made with raw dough. With pre- or par-baked crusts, the cell structure is already set. With raw dough, the rack 10 provides an opportunity for the dough to rise and the air cells to expand, and for the dough to partially bake with the expanded air cells. The high temperature browning oven 80 then finishes the baking and browns the pizza, bringing out the flavor of the dough and the cheese.

Of course, the browning oven 80 is not intended for use solely with pizza and could be used with a wide variety of foods for which a short exposure to high temperatures is desirable.

Figure 19:
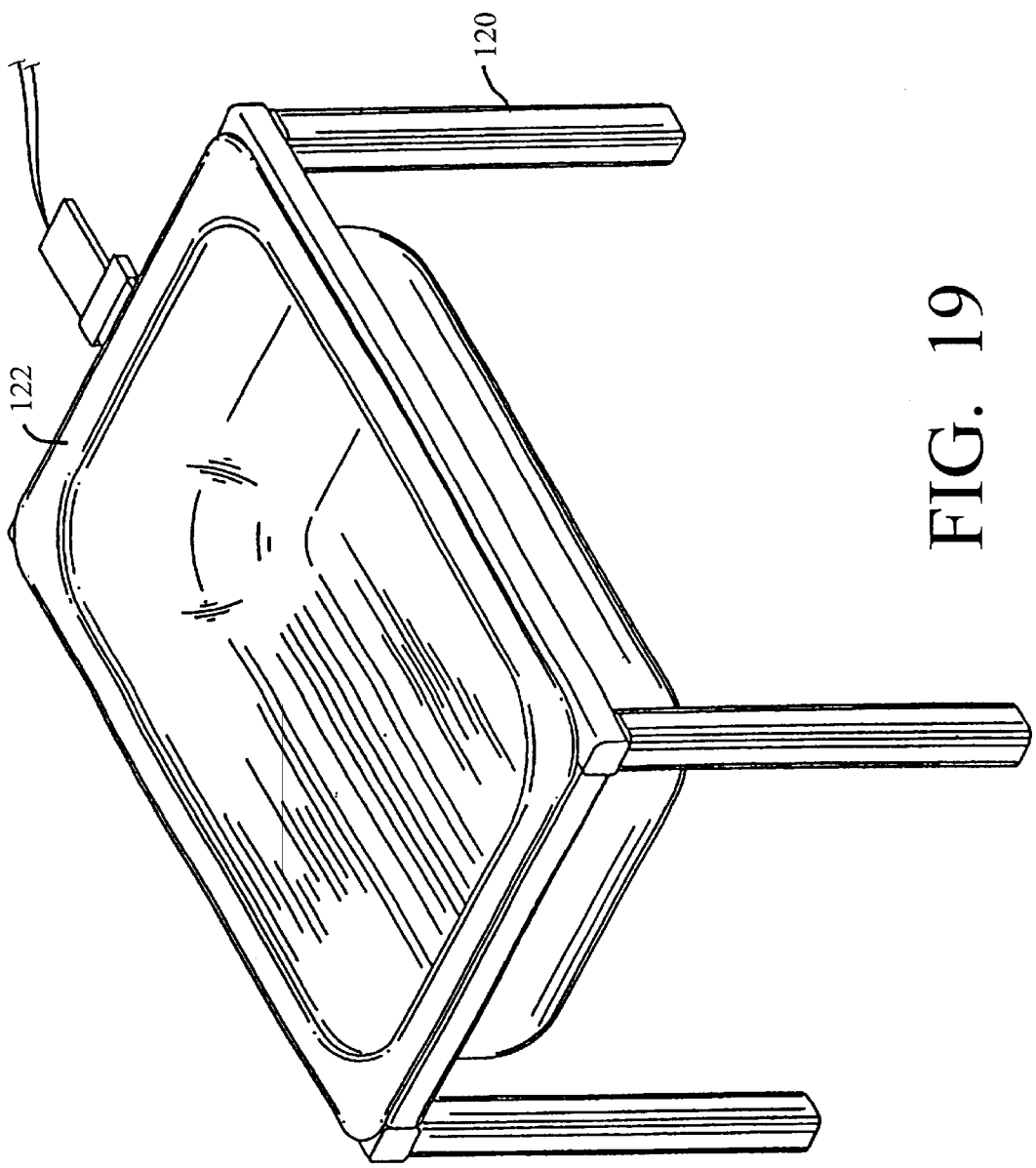
FIG. 19 is a perspective view of a curved chafing dish heater made in accordance with the present invention.
Figure 20:
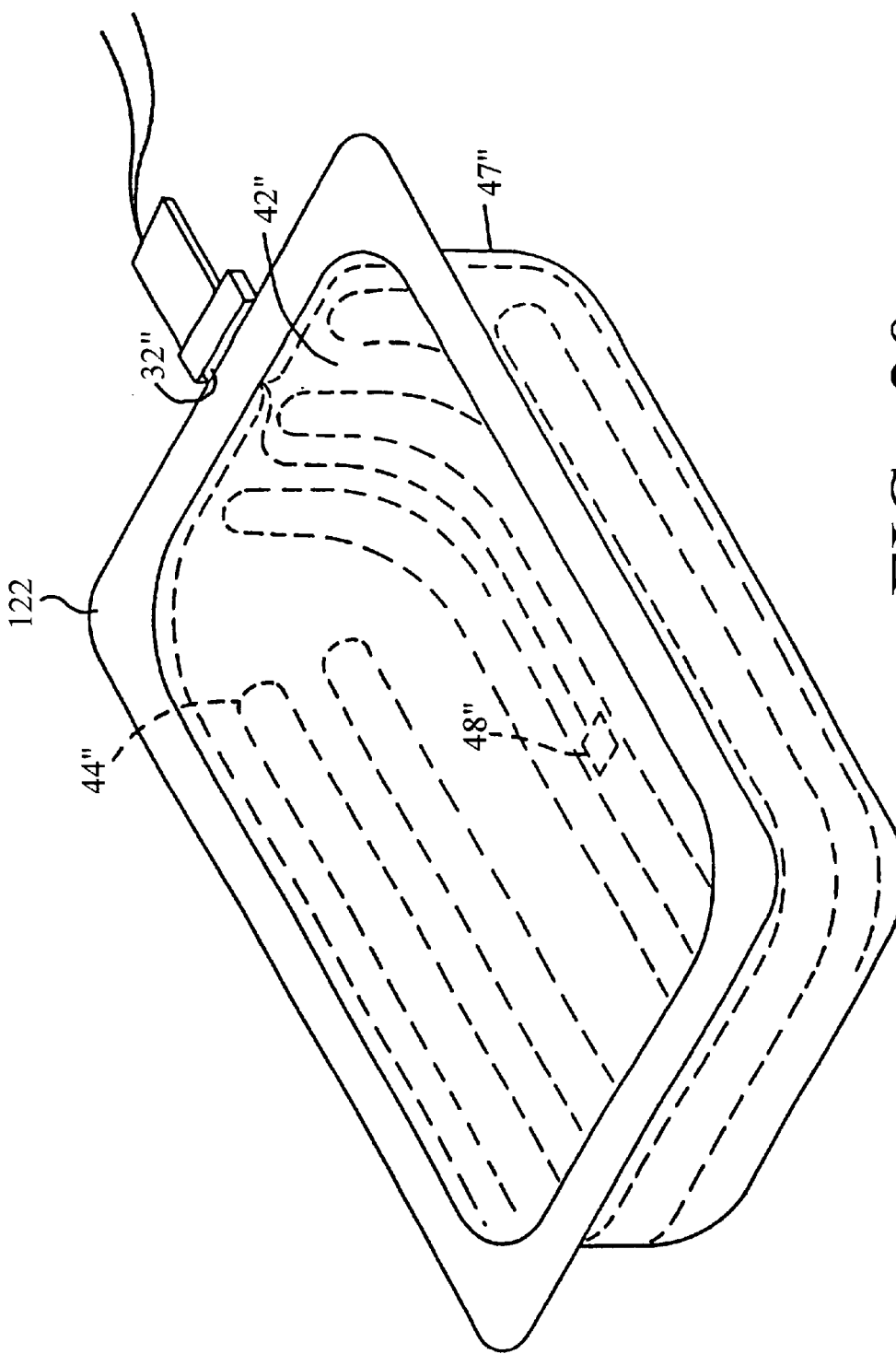
FIG. 20 is a perspective view of the chafing dish heater of FIG. 19, showing some of the internal elements in phantom.
Figure 21:
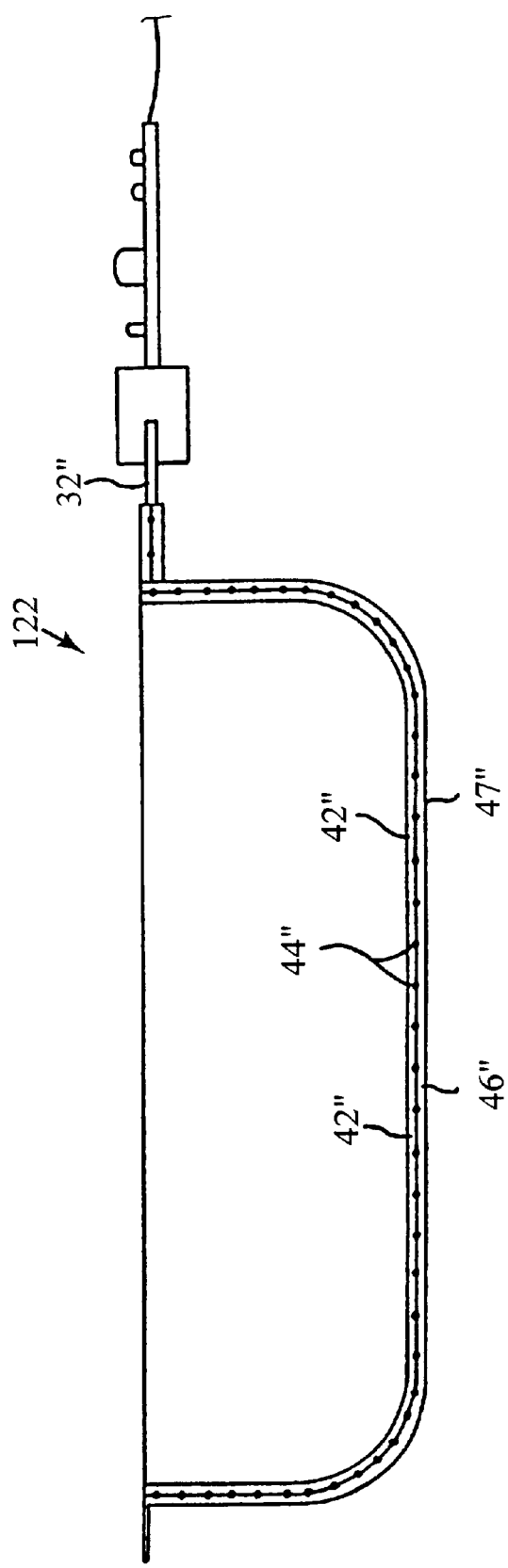
FIG. 21 is a side sectional view of the chafing dish heater of FIG. 20.
Figure 22:
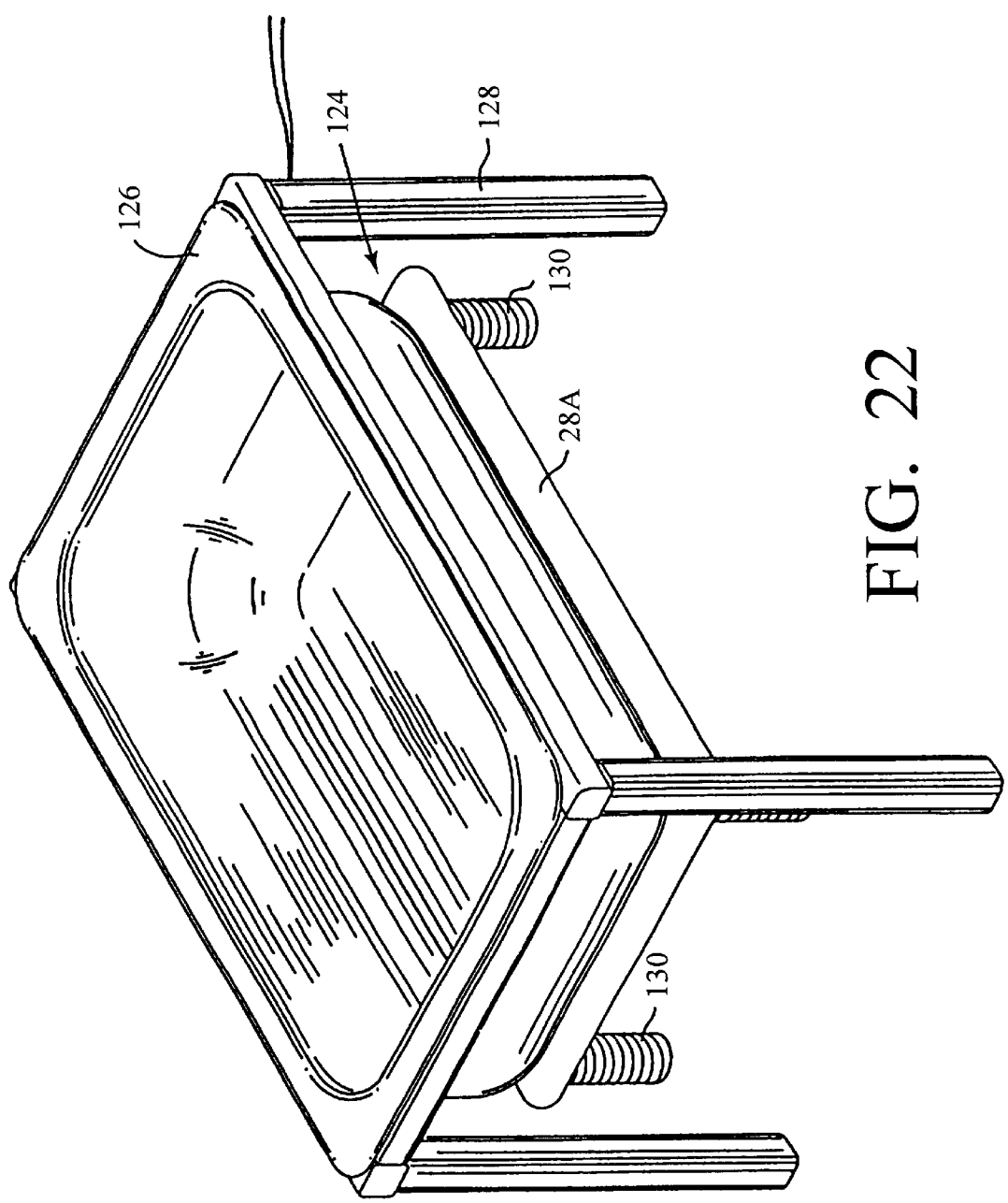
FIG. 22 is an alternative embodiment of a chafing dish heater made in accordance with the present invention.

Variations on the basic flat plate 28 are shown in FIGS. 19–22. FIGS. 19–21 show a first embodiment of a chafing dish heater, and FIG. 22 shows a second embodiment of a chafing dish heater. Chafing dishes are often used in catering, and the chafing dishes are usually heated by burning Sterno under them. This creates pollutants as well as being a fire hazard, and the Sterno is at temperatures that will cause the food to dry out over time. FIG. 19 shows a stand 120, which supports the chafing dish heater 122. The chafing dish heater 122 is essentially the same as the plates 28, 28', except that it has been formed in a shape corresponding to the shape of a chafing dish, so that a chafing dish filled with water can be placed directly into the heater 122. It would also be possible to put the water directly into the chafing dish heater 122.

As shown in FIGS. 20 and 21, the chafing dish heater 122 includes top and bottom plates 38", 47", silicone sheets 42", 46", an embedded electrical resistance heater 44" and sensor 48", as well as an edge connector 32" as found in the plates 28. The chafing dish heater 122 has the same type of controls as are found at each individual plate 28 on the rack 10.

FIG. 22 is an alternative type of chafing dish heater 124. In this case, the chafing dish 126 is placed on a stand 128, and the chafing dish heater 124 contacts the bottom surface of the chafing dish 126 to heat the food in the chafing dish 126 by conduction. The plate 124 heats the chafing dish, which heats the water inside the chafing dish, which heats the pan holding the food, which heats the food. The power of the plate 124 must be substantially greater than the power of a normal plate 28, because it must maintain the temperature of the water in the chafing dish at the desired set temperature, which requires much greater energy input than when food is placed directly on the plate. Thus, this type of plate will draw substantially more than the 200 watts per square foot of other plates. The control for the plate 124 is set to maintain the equilibrium temperature of the plate 124 at the desired set temperature, which again is in the range of 160° F. to 185° F., ±5° F., with a maximum temperature of approximately 190° F. The plate 28A of the chafing dish heater 124 is made the same way as the plate 28, except that its dimensions are made to fit the size of a chafing dish, and it has a higher power rating. Also, springs 130 support the plate 28A at all four corners to bias the plate 28A upwardly into contact with the bottom of the chafing dish 126.

Figure 22A:
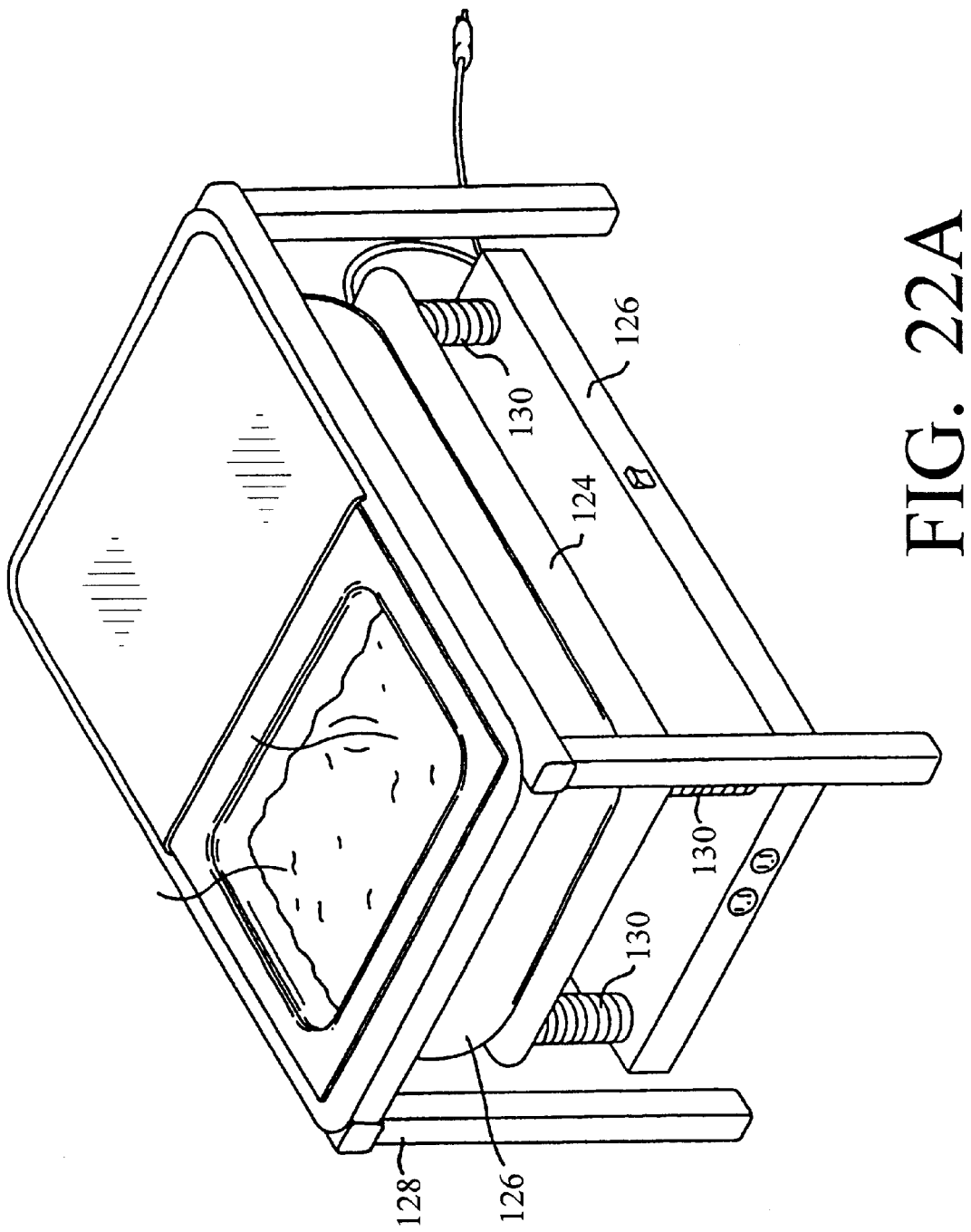
FIG. 22A is a second alternative embodiment of a chafing dish heater made in accordance with the present invention.

FIG. 22A is another alternative embodiment similar to FIG. 22, but showing a control module 126 below the springs 130. The control module 126 includes an on-off switch and additional outlets so that the chafing dish heaters can be connected together.

Figure 5:
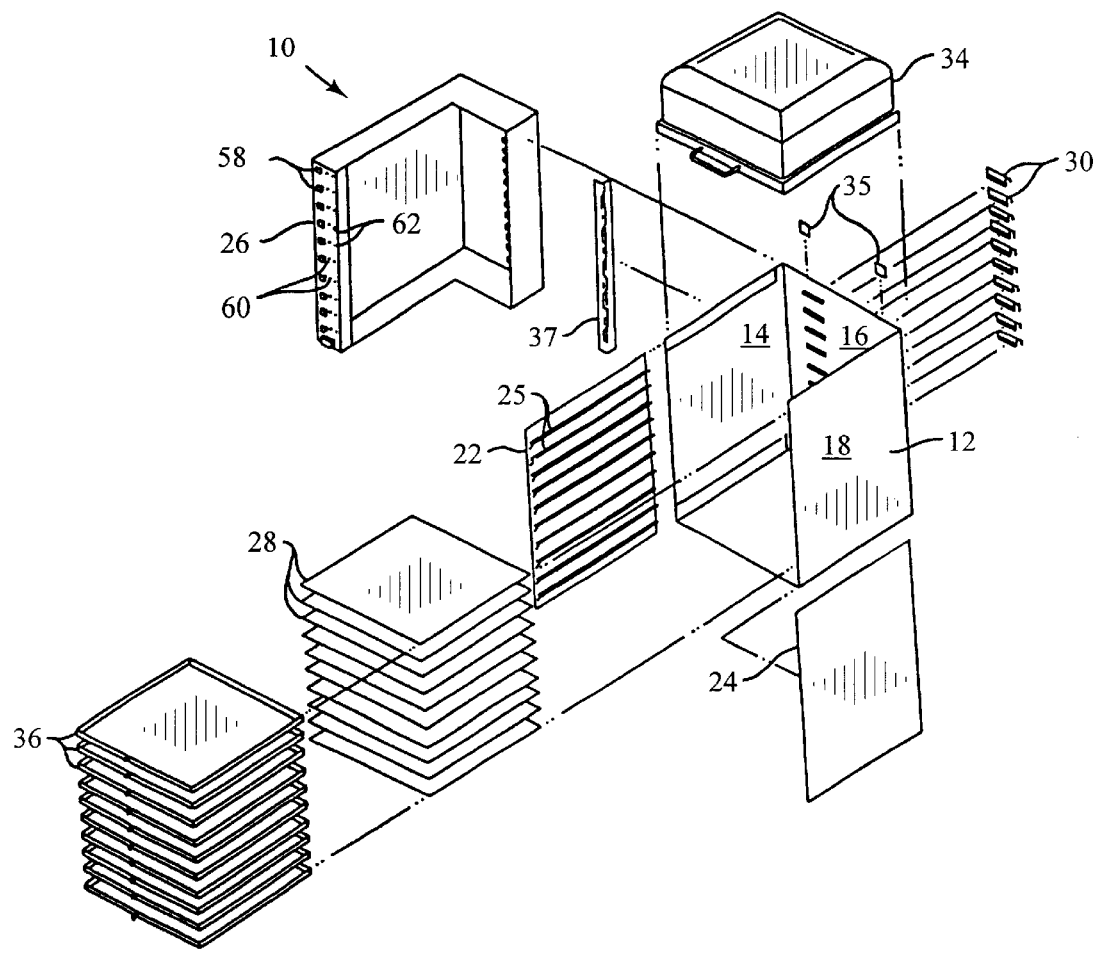
FIG. 5 is an exploded perspective view of the food thermalization rack of FIG. 1.
Figure 23:
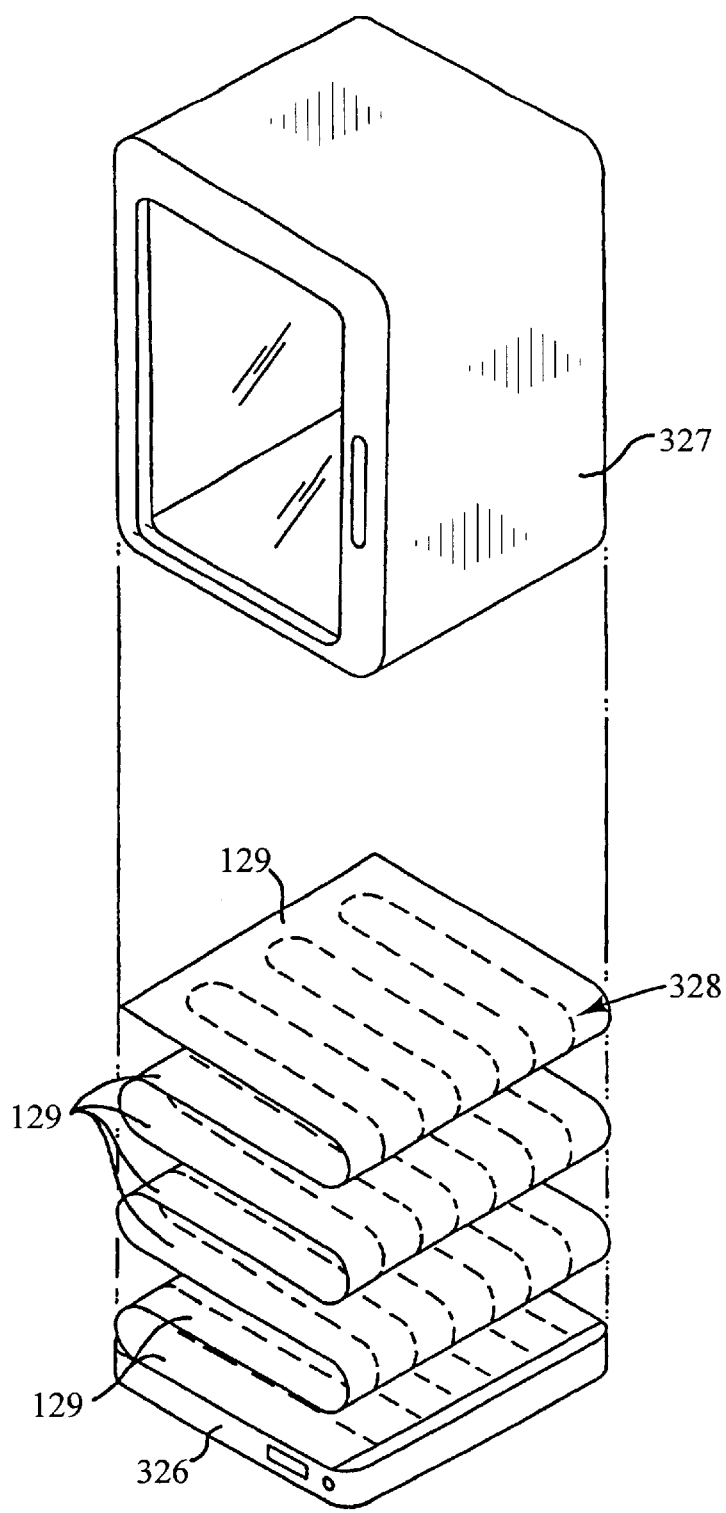
FIG. 23 is an alternative embodiment of a food thermalization rack made in accordance with the present invention.
Figure 24:
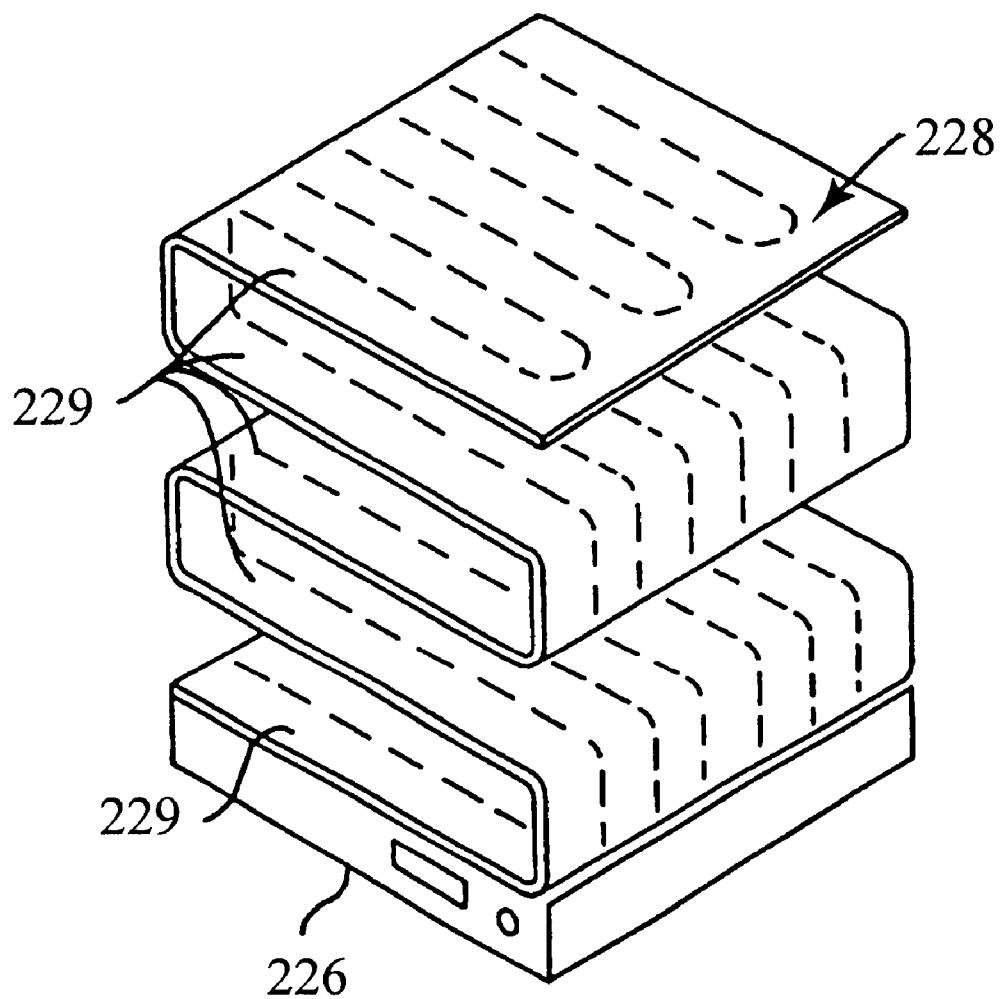
FIG. 24 is another alternative embodiment of a food thermalization rack made in accordance with the present invention.

FIGS. 23 and 24 show alternative embodiments of a food thermalization rack. Instead of having several individual plates 28, as shown in the embodiment of FIG. 5, these embodiments have a single plate 328, 228, which has been formed into an undulated shape to create several parallel shelves 129, 229 for supporting food. These plates 328, 228 may be made as a flat metal sandwich, as was described above with respect to the plates 28, and the flat metal sandwich may then be bent into the desired undulated shape to form the parallel, horizontal food support shelves 129, 229, or the sheets of the metal sandwich may be preformed in the undulated shape and then the parts assembled as described above, or the undulated plate may be molded of a ceramic, plastic, or other conductive material with embedded electrical resistance heating elements in the desired shape. Other manufacturing methods may also be used. In these embodiments, the control blocks 326, 226 preferably are located at the bottom of the unit. A housing 327, having a front door and an open bottom, may be placed over the plate 328 or 228 and rests on the control block 326, 226. The control in these embodiments is essentially the same as the control in FIG. 14 for a single plate of the first embodiment. However, for these embodiments, which are intended to be made inexpensively for home use, there probably will not be red and green lights and a timer to show whether the food has spent a sufficient amount of time being heated. Instead, there may be a timer that can be set to have the heater come on at a certain preset time, so that, for example, frozen food may be placed on the shelves of the unit in the morning, as people are leaving home for school or work, and the timer may be set to come on for 4:00 in the afternoon, so the food will be ready to eat for supper. The undulations may be made as smooth curves, as shown in FIG. 23 or as sharp curves, as shown in FIG. 24. The spacing between shelves preferably is the same as in the first embodiment, and these embodiments preferably would use food-supporting trays as in the first embodiment.

Figure 25:
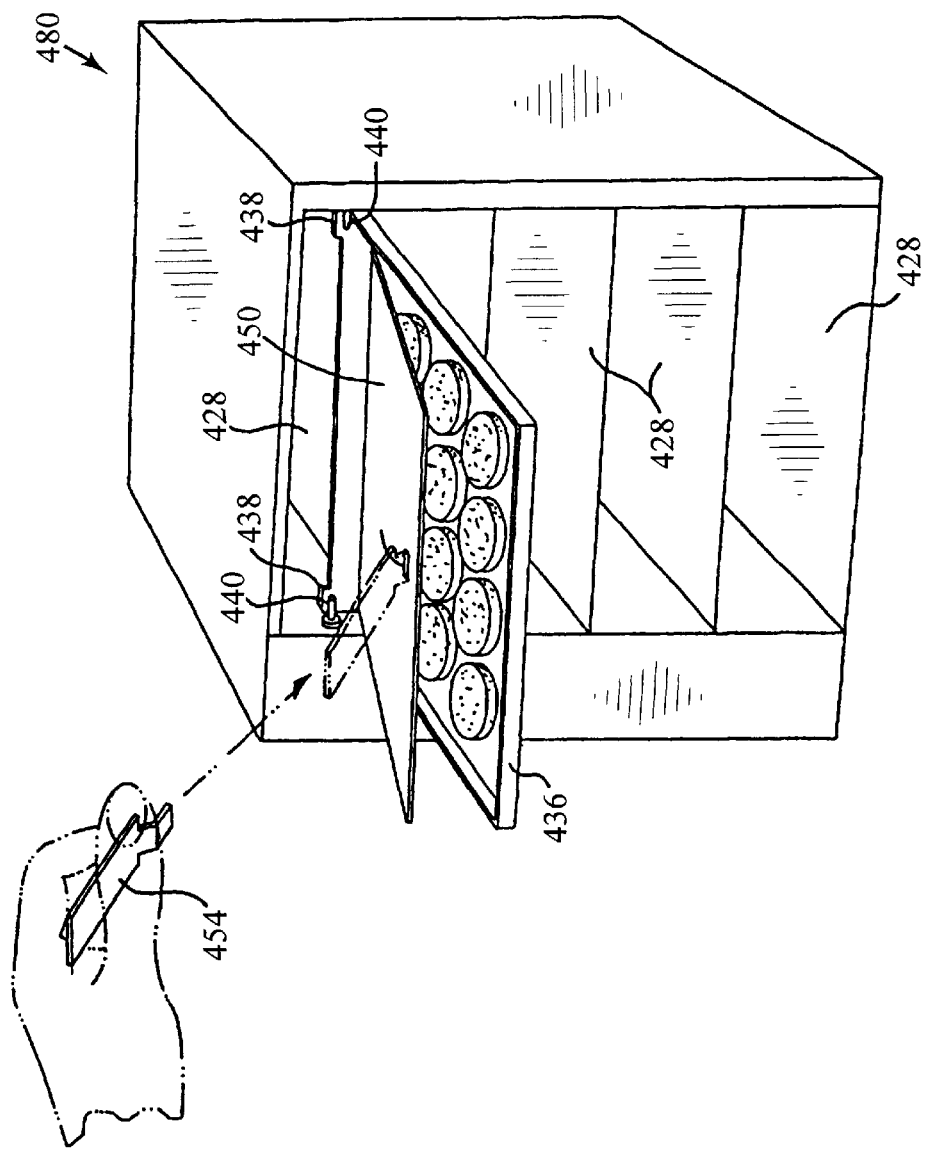
FIG. 25 is a perspective view of a food thermalization rack similar to that shown in FIG. 1 but with a few modifications.

FIG. 25 shows a food thermalization rack 400 that is very similar to the rack 10 of FIGS. 1–11, except that the plates are spaced farther apart than in the first embodiment—approximately four inches apart. The plates 428 are those shown in FIGS. 27–29, which have already been described. Each food support tray 436 is the same as the trays 36 in the first embodiment, except that each tray 436 includes upwardly-extending projections 438 at its rear edge, and the shell of the rack 400 includes inwardly-projecting arms 440, which contact the projections 438 when the tray 436 is pulled out, to prevent the tray from falling out of the rack 400.

In this embodiment shown in FIG. 25, an optional heat-conducting insert 450 is placed on top of the sealed food to help heat the top surface of the food. The insert 450 preferably is just a piece of metal or other heat-conducting material with a slot 452 near its front edge. It does not have any embedded electrical heaters, but it does absorb heat from the plates 428 and conducts that heat to the top surface of the food. In order to remove the heat-conducting insert 450, a simple tool 454 is used. The tool 454 is inserted into the slot and then functions as a handle for the heat-conducting insert 450.

Figure 26:
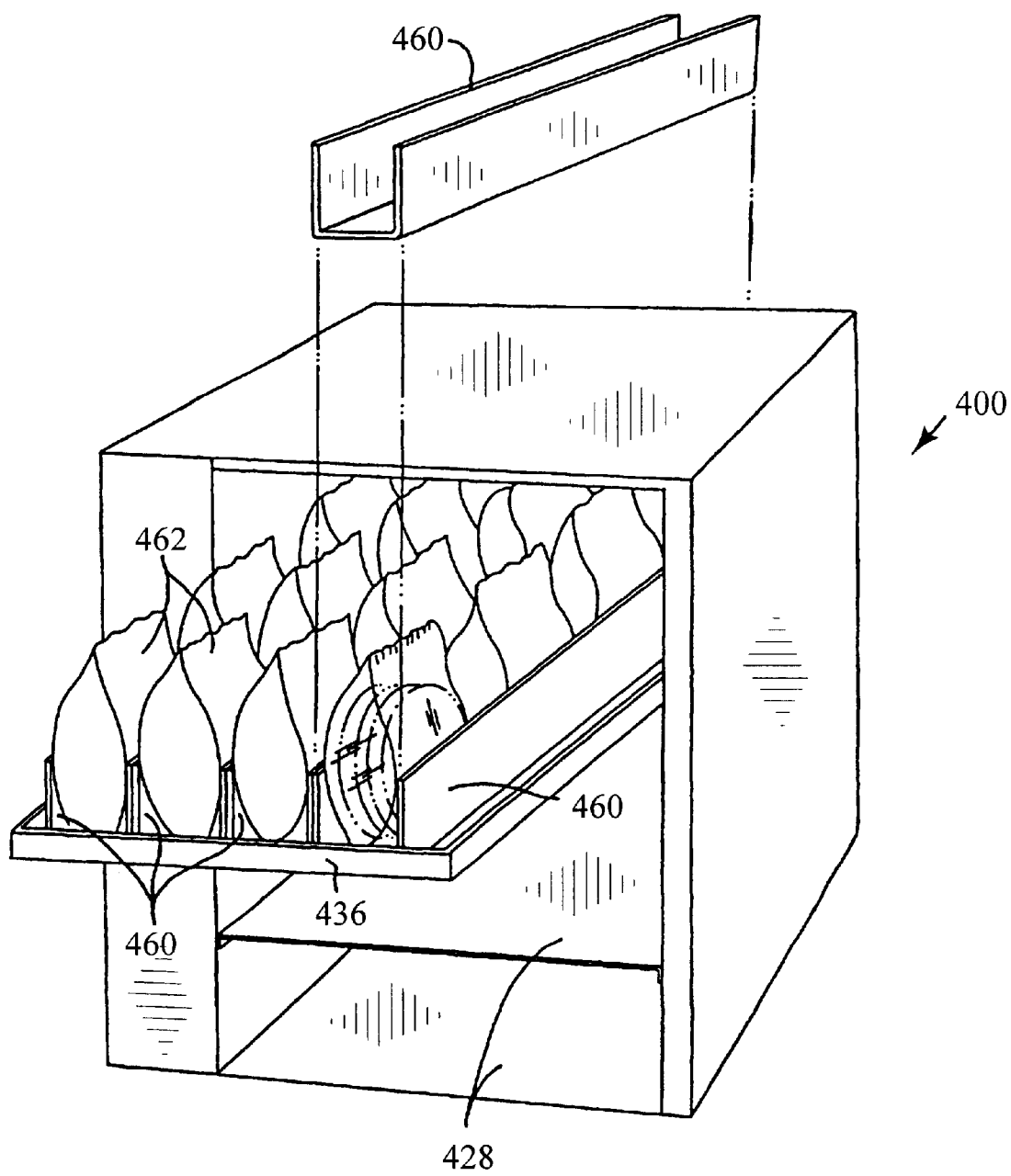
FIG. 26 is a perspective view of the same rack as that shown in FIG. 25 but with a different insert on the food support tray.

FIG. 26 shows the same embodiment of the rack 400 as in FIG. 25, but a different type of insert has been added to the tray 436 in this embodiment. Here, four U-shaped channels 460, preferably made of the same type of heat-conducting material as the tray 436, are inserted onto the tray 436, and the sealed packages of food 462 are placed on edge in the channels 460. In this view, the packages of food 462 preferably are hamburgers or chicken sandwiches, including the bun. By inserting the sandwiches vertically in the channels 460, the buns do not become soggy or hard at the outer crust as they might if they were placed in a normal horizontal position. The channels 460 serve as heat transfer fins, improving the heat transfer to the food. Each channel 460 preferably is approximately 2-⅞ inches wide and 2-⅝ inches high in order to accommodate normal hamburgers and sandwiches, but the dimensions could be changed depending upon on the type of food to be inserted. Also, while this preferred embodiment uses individual channels, it would also be possible to simply make the trays 436 with vertically-projecting fins, which would use less material. An advantage of the channels 460 is that it would be possible to use just one or two channels on a tray and leave the rest of the tray for use with flat, horizontally-oriented food products, as needed, thereby making the availability of the trays more flexible.

It will be obvious to those skilled in the art that modifications may be made to the embodiments described above without departing from the scope of the present invention.

What is claimed is:

1. A method of thermalizing and holding food, the steps of which comprise:

placing food on a plate;

putting an electrical resistance heater in thermally conductive contact with said plate;

controlling the resistance heater to maintain the equilibrated temperature of the plate at a temperature in the range of 160° F. to 180° F., with the temperature fluctuation within the range of plus or minus 5° F. once equilibrium has been reached;

holding food on the plate at the set temperature for a desired time period;

removing food from the plate; and then exposing the food to high temperature infrared radiation at a temperature in the range of 1500° F. to 1600° F. for a short period of time to brown the food.

2. A method as recited in claim 1, and further comprising the steps of:

removing the food from the plate; and then exposing the food to high temperature infrared radiation at a temperature in the range of 1500° F. to 1600° F. for a short period of time to brown the food.

3. A method of thermalizing and holding food as recited in claim 1, and further comprising the step of providing vertically-extending heat-conducting fins in heat-conductive contact with said plate, so that said food is heated on its sides from said fins.

4. A method for thermalizing and holding food, the steps of which comprise placing food on a plate;

putting an electrical resistance heater in thermally conductive contact with said plate;

controlling the resistance heater to maintain the equilibrated temperature of the plate at a temperature in the range of 160° F. to 180° F., with a temperature fluctuation in the range of plus or minus 5° F. once equilibrium has been reached;

holding the food on the plate at the set temperature for a desired time period; and covering the food with a heat conducting insert.

5. A method of thermalizing and holding food as recited in claim 4, and further comprising the step of providing vertically-extending heat-conducting fins in heat-conductive contact with the plate, so that said food is heated on its sides from said fins.

6. A device for thermalizing food comprising:

a flat heat conducting plate defining an upper food-contact surface having a food contact surface area;

an electrical resistance heater in contact with said plate; and a plurality of U-shaped channels constructed of a heat conducting material, each of said channels having a flat base and a pair of spaced apart sidewalls integrally attached to and projecting perpendicularly from opposite sides of said base.

7. A method as recited in claim 4, the steps of which further comprise removing the food from the plate; and then exposing the food to high temperature infrared radiation at a temperature in the range of 1500° F. to 1600° F. for a short time period to brown the food.

* * * * *